United States Patent
Delco

(10) Patent No.: US 7,478,173 B1
(45) Date of Patent: Jan. 13, 2009

(54) METHOD AND SYSTEM FOR SHARING A NETWORK CONNECTION IN A VIRTUAL COMPUTER SYSTEM

(75) Inventor: Matthew Ray Delco, Sunnyvale, CA (US)

(73) Assignee: WMware, Inc., Palo Alto, CA (US)

( * ) Notice: Subject to any disclaimer, the term of this patent is extended or adjusted under 35 U.S.C. 154(b) by 824 days.

(21) Appl. No.: 10/741,242

(22) Filed: Dec. 18, 2003

(51) Int. Cl.
*G06F 15/16* (2006.01)

(52) U.S. Cl. ...................................... 709/250

(58) Field of Classification Search ................ 709/250, 709/224–226, 249, 236
See application file for complete search history.

(56) References Cited

U.S. PATENT DOCUMENTS

| | | | |
|---|---|---|---|
| 6,172,981 B1* | 1/2001 | Cox et al. | 370/401 |
| 6,212,563 B1* | 4/2001 | Beser | 709/227 |
| 6,496,847 B1* | 12/2002 | Bugnion et al. | 718/1 |
| 7,111,303 B2* | 9/2006 | Macchiano et al. | 719/313 |
| 7,127,524 B1* | 10/2006 | Renda et al. | 709/245 |
| 7,213,065 B2* | 5/2007 | Watt | 709/223 |
| 7,228,337 B1* | 6/2007 | Bornstein et al. | 709/217 |
| 2004/0267866 A1* | 12/2004 | Carollo et al. | 709/200 |
| 2005/0027834 A1* | 2/2005 | Chen et al. | 709/222 |

OTHER PUBLICATIONS

Freesoft, "RFC 2131 Protocol Summary," Jan. 18, 1998, <http://web.archive.org/web/19980118180533/http://www.freesoft.org/CIE/RFC/2131/8.htm>.*
Kuciel, Jim, "Link Aggregation with 802.3ad," Nov. 13, 2000, Network World, pp. 1-3, <http://www.itworld.com/Net/1750/NWW001113tech/>.*
Cisco Press, "Ethernet Technologies," Jan. 24, 2002, pp. 1-36, <http://web.archive.org/web/20020124175541/http://www.cisco.com/univercd/cc/td/doc/cisintwk/ito_doc/ethernet.htm>.*

* cited by examiner

*Primary Examiner*—Farhad Ali
(74) *Attorney, Agent, or Firm*—Darryl A. Smith; Rajeev Madnawat

(57) ABSTRACT

A virtual computer system including multiple virtual machines (VMs) is implemented in a single physical computer system. The multiple VMs have their own layer 2 and layer 3 addresses, but they share a common network connection for which only a single layer 2 address may be used, such as in the case of a standard wireless network interface card (NIC) or in the case of multiple NICs and a standard NIC teaming solution. For outgoing data frames from a VM to a network entity outside the virtual computer system, the layer 2 address of the VM contained in the source address field is generally replaced with the layer 2 address of the network connection. For incoming data frames from a network entity to a VM, the layer 2 address of the network connection contained in the destination address field is generally replaced with the layer 2 address of the VM.

30 Claims, 12 Drawing Sheets

FIG. 8

| | SRC MAC | DEST MAC | SEND MAC | SEND IP | TARG MAC | TARG IP |
|---|---|---|---|---|---|---|
| OUTGOING ARP QUERY | VM → HOST | BROADCAST, NW ENTITY | VM → HOST | VM | UNDEFINED | NW ENTITY |
| INCOMING ARP REPLY | NW ENTITY | BROADCAST, HOST → VM | NW ENTITY | NW ENTITY | HOST → VM | VM |
| OUTGOING RARP QUERY | VM → HOST | BROADCAST, NW ENTITY | VM → HOST | UNDEFINED | VM | UNDEFINED |
| INCOMING RARP REPLY | NW ENTITY | BROADCAST, HOST → VM | NW ENTITY | NW ENTITY | VM | VM |
| OUTGOING IARP QUERY | VM → HOST | NW ENTITY | VM → HOST | VM | NW ENTITY | UNDEFINED |
| INCOMING IARP REPLY | NW ENTITY | BROADCAST, HOST → VM | NW ENTITY | NW ENTITY | HOST → VM | VM |
| OUTGOING ARP QUERY | NW ENTITY | BROADCAST, HOST → VM | NW ENTITY | NW ENTITY | UNDEFINED | VM |
| INCOMING ARP REPLY | VM → HOST | BROADCAST, NW ENTITY | VM → HOST | VM | NW ENTITY | NW ENTITY |
| OUTGOING RARP QUERY | NW ENTITY | BROADCAST, HOST → VM | NW ENTITY | UNDEFINED | NW ENTITY | UNDEFINED |
| INCOMING RARP REPLY | VM → HOST | BROADCAST, NW ENTITY | VM → HOST | VM | NW ENTITY | NW ENTITY |
| OUTGOING IARP QUERY | NW ENTITY | HOST → VM | NW ENTITY | NW ENTITY | VM | UNDEFINED |
| INCOMING IARP REPLY | VM → HOST | BROADCAST, NW ENTITY | VM → HOST | VM | NW ENTITY | NW ENTITY |

METHOD AND SYSTEM FOR SHARING A NETWORK CONNECTION IN A VIRTUAL COMPUTER SYSTEM

BACKGROUND OF THE INVENTION

1. Field of the Invention

This invention relates to the field of computer virtualization, that is, to systems and methods for implementing computers as software running on an underlying host hardware platform.

2. Description of the Related Art

Virtualization has brought many advantages to the world of computers. As is well known in the art, a virtual machine (VM) is a software abstraction—a "virtualization"—of a physical computer system that runs as a "guest" on an underlying "host" hardware platform. As long as a suitable interface is provided between the VM and the host platform, one advantage is that the operating system (OS) in the guest need not be the same as the OS at the system level in the host. For example, applications that presuppose a Microsoft Windows OS can be run in the VM even though the OS used to handle actual I/O, memory management, etc., on the host might be Linux.

It usually requires less than 10% of the processing capacity of a CPU to run a typical application, although usage may peak briefly for certain operations. Virtualization can more efficiently use processing capacity by allowing more than one VM to run on a single host, effectively multiplying the number of "computers" per "box." Depending on the implementation, the reduction in performance is negligible, or at least not enough to justify separate, dedicated hardware "boxes" for each user.

Still another advantage is that different VMs can be isolated from and completely transparent to one another. Indeed, the user of a single VM will normally be unaware that he is not using a "real" computer, that is, a system with hardware dedicated exclusively to his use. The existence of the underlying host will also be transparent to the VM software itself. The products of VMware, Inc., of Palo Alto, Calif. provide all of these advantages in that they allow multiple, isolated VMs, which may (but need not) have OSs different from each other's, to run on a common hardware platform.

Example of a Virtualized System

FIG. 1 illustrates the main components of a system 10 that supports a virtual machine as implemented in the Workstation product of VMware, Inc. As in conventional computer systems, both system hardware 100 and system software 200 are included. The system hardware 100 includes CPU(s) 102, which may be a single processor, or two or more cooperating processors in a known multiprocessor arrangement. The system hardware also includes system memory 104, one or more disks 106, and some form of memory management unit MMU 112. As is well understood in the field of computer engineering, the system hardware also includes, or is connected to, conventional registers, interrupt-handling circuitry, a clock, etc., which, for the sake of simplicity, are not shown in the figure.

The system software 200 either is or at least includes an operating system (OS) 220, which has drivers 240 as needed for controlling and communicating with various devices 110, and usually with the disk 106 as well. Conventional applications 260, if included, may be installed to run on the hardware 100 via the system software 200 and any drivers needed to enable communication with devices.

As mentioned above, the virtual machine (VM) 300—also known as a "virtual computer"—is a software implementation of a complete computer system. In the VM, the physical system components of a "real" computer are emulated in software, that is, they are virtualized. Thus, the VM 300 will typically include virtualized ("guest") system hardware 301, which in turn includes one or more virtual CPUs 302 (VCPU), virtual system memory 304 (VMEM), one or more virtual disks 306 (VDISK), and one or more virtual devices 310 (VDEVICE), all of which are implemented in software to emulate the corresponding components of an actual computer.

The VM's system software 320 includes a guest operating system 330, which may, but need not, simply be a copy of a conventional, commodity OS, as well as drivers 340 (DRVS) as needed, for example, to control the virtual device(s) 310. Of course, most computers are intended to run various applications, and a VM is usually no exception. Consequently, by way of example, FIG. 1 illustrates one or more applications 360 installed to run on the guest OS 330; any number of applications, including none at all, may be loaded for running on the guest OS, limited only by the requirements of the VM.

Note that although the hardware "layer" 301 will be a software abstraction of physical components, the VM's system software 320 may be the same as would be loaded into a hardware computer. The modifier "guest" is used here to indicate that the VM, although it acts as a "real" computer from the perspective of a user, is actually just computer code that is executed on the underlying "host" hardware and software platform 100, 200. Thus, for example, I/O to the virtual device 310 will actually be carried out by I/O to the hardware device 110, but in a manner transparent to the VM.

If the VM is properly designed, then the applications (or the user of the applications) will not "know" that they are not running directly on "real" hardware. Of course, all of the applications and the components of the VM are instructions and data stored in memory, just as any other software. The concept, design and operation of virtual machines are well known in the field of computer science. FIG. 1 illustrates a single VM 300 merely for the sake of simplicity, to illustrate the structure and operation of that single VM; in many installations, there will be more than one VM installed to run on the common hardware platform; all will have essentially the same general structure, although the individual components need not be identical. In fact, installations involving multiple VMs are of particular relevance to this invention.

Some interface is usually required between the VM 300 and the underlying "host" hardware 100, which is responsible for actually executing VM-related instructions and transferring data to and from the actual, physical memory 104. One advantageous interface between the VM and the underlying host system is often referred to as a virtual machine monitor (VMM), also known as a virtual machine "manager." Virtual machine monitors have a long history, dating back to mainframe computer systems in the 1960s. See, for example, Robert P. Goldberg, "Survey of Virtual Machine Research," IEEE Computer, June 1974, p. 54-45.

A VMM is usually a relatively thin layer of software that runs directly on top of a host, such as the system software 200, or directly on the hardware, and virtualizes the resources of the (or some) hardware platform. The VMM will typically include at least one device emulator 410, which may also form the implementation of the virtual device 310. The interface exported to the respective VM is usually such that the guest OS 330 cannot determine the presence of the VMM. The VMM also usually tracks and either forwards (to the host OS 220) or itself schedules and handles all requests by its VM for machine resources, as well as various faults and interrupts. FIG. 1 therefore illustrates an interrupt (including fault) handler 450 within the VMM. The general features of VMMs are well known and are therefore not discussed in further detail here.

In FIG. 1, a single VMM 400 is shown acting as the interface for the single VM 300. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VMNMM configurations.

In some configurations, the VMM 400 runs as a software layer between the host system software 200 and the VM 300. In other configurations, such as the one illustrated in FIG. 1, the VMM runs directly on the hardware platform 100 at the same system level as the host OS. In such case, the VMM may use the host OS to perform certain functions, including I/O, by calling (usually through a host API—application program interface) the host drivers 240. In this situation, it is still possible to view the VMM as an additional software layer inserted between the hardware 100 and the guest OS 330. Furthermore, it may in some cases be beneficial to deploy VMMs on top of a thin software layer, a "kernel," constructed specifically for this purpose.

FIG. 2 illustrates yet another implementation, in which a kernel 650 takes the place of and performs the conventional functions of the host OS. Compared with a system in which VMMs run directly on the hardware platform, use of a kernel offers greater modularity and facilitates provision of services that extend across multiple virtual machines (for example, resource management). Compared with the hosted deployment, a kernel may offer greater performance because it can be co-developed with the VMM and be optimized for the characteristics of a workload consisting of VMMs.

As used herein, the "host" OS therefore means either the native OS 220 of the underlying physical computer, or whatever system-level software handles actual I/O operations, takes faults and interrupts, etc. for the VM. The invention may be used in all the different configurations described above.

Memory Mapping and Address Terminology

In most modern computers, memory is addressed as units known as "pages," each of which is identified by a corresponding page number. The most straightforward way for all components in a computer to uniquely identify a memory page would be for them all simply to use a common set of page numbers. This is almost never done, however, for many well-known reasons. Instead, user-level software normally refers to memory pages using one set of identifiers, which is then ultimately mapped to the set actually used by the underlying hardware memory.

When a subsystem requests access to the hardware memory 104, for example, the request is usually issued with a "virtual address," since the memory space that the subsystem addresses is a construct adopted to allow for much greater generality and flexibility. The request must, however, ultimately be mapped to an address that is issued to the actual hardware memory. This mapping, or translation, is typically specified by the operating system (OS), which includes some form of memory management module 245 included for this purpose. The OS thus converts the "virtual" address (VA), in particular, the virtual page number (VPN) of the request, into a "physical" address (PA), in particular, a physical page number (PPN), that can be applied directly to the hardware. (The VA and PA have a common offset from a base address, so that only the VPN needs to be converted into a corresponding PPN.)

When writing a given word to a virtual address in memory, the processor breaks the virtual address into a virtual page number (higher-order address bits) plus an offset into that page (lower-order address bits). The virtual page number (VPN) is then translated using mappings established by the OS into a physical page number (PPN) based on a page table entry (PTE) for that VPN in the page table associated with the currently active address space. The page table will therefore generally include an entry for every VPN. The actual translation may be accomplished simply by replacing the VPN (the higher order bits of the virtual address) with its PPN mapping, leaving the lower order offset bits the same.

To speed up virtual-to-physical address translation, a hardware structure known as a translation look-aside buffer (TLB) is normally included, for example, as part of a hardware memory management unit (MMU) 112. The TLB contains, among other information, VPN-to-PPN mapping entries at least for VPNs that have been addressed recently or frequently. Rather than searching the entire page table, the TLB is searched first instead. If the current VPN is not found in the TLB, then a "TLB miss" occurs, and the page tables in memory are consulted to find the proper translation, and the TLB is updated to include this translation. After the TLB miss fault is handled, the same memory access is attempted again, and this time, the required VPN-to-PPN mapping is found in the TLB. The OS thus specifies the mapping, but the hardware MMU 112 usually actually performs the conversion of one type of page number to the other. Below, for the sake of simplicity, when it is stated that a software module "maps" page numbers, the existence and operation of a hardware device such as the MMU 112 may be assumed.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Patterson and Hennessy analogize address translation to finding a book in a library. The VPN is the "title" of the book and the full card catalog is the page table. A catalog card is included for every book in the library and tells the searcher where the book can be found. The TLB is then the "scratch" paper on which the searcher writes down the locations of the specific books he has previously looked up.

An extra level of addressing indirection is typically implemented in virtualized systems in that a VPN issued by an application 360 in the VM 300 is remapped twice in order to determine which page of the hardware memory is intended. A mapping module 345 within the guest OS 330 translates the guest VPN (GVPN) into a corresponding guest PPN (GPPN) in the conventional manner. The guest OS therefore "believes" that it is directly addressing the actual hardware memory, but in fact it is not. Of course, a valid address to the actual hardware memory address must, however, ultimately be used.

An address mapping module 445 in the VMM 400 therefore takes the GPPN issued by the guest OS 330 and maps it to a hardware page number PPN that can be used to address the hardware memory. From the perspective of the guest OS, the GVPN and GPPN are virtual and physical page numbers just as they would be if the guest OS were the only OS in the system. From the perspective of the actual host OS, however, the GPPN is a page number in the virtual address space, that is, a VPN, which is then mapped into the physical memory space of the hardware memory as a PPN. Note that in some literature involving virtualized systems, GVPNs, GPPNs, VPNs and PPNs are sometimes referred to as "VPNs," "PPNs," "VPNs" and "MPNs," respectively, where "MPN" means "machine page number," that is, the page number used to address the hardware memory. The problem is, though, that "VPN" is then used to mean the virtual page number in both the guest and host contexts, and one must always be aware of the current context to avoid confusion. Regardless of notation, however, the intermediate GPPN→PPN mapping performed by the VMM is transparent to the guest system.

Speed is a critical issue in virtualization—a VM that perfectly emulates the functions of a given computer but that is too slow to perform needed tasks is obviously of little good to a user. Ideally, a VM should operate at the native speed of the underlying host system. In practice, even where only a single VM is installed on the host, it is impossible to run a VM at native speed, if for no other reason than that the instructions that define the VMM must also be executed. Near native speed, is possible, however, in many common applications.

The highest speed for a VM is found in the special case where every VM instruction executes directly on the hardware processor. This would in general not be a good idea, however, because the VM should not be allowed to operate at the greatest privilege level; otherwise, it might alter the instructions or data of the host OS or the VMM itself and cause unpredictable behavior. Moreover, in cross-architectural systems, one or more instructions issued by the VM may not be included in the instruction set of the host processor. Instructions that cannot (or must not) execute directly on the host are typically converted into an instruction stream that can. This conversion process is commonly known as "binary translation."

U.S. Pat. No. 6,397,242 (Devine, et al., "Virtualization system including a virtual machine monitor for a computer with a segmented architecture"), which is incorporated herein by reference, describes a system in which the VMM includes a mechanism that allows VM instructions to execute directly on the hardware platform whenever possible, but that switches to binary translation when necessary. FIG. 1 shows a direct execution engine 460 and a binary translation engine 462, for performing these respective functions. Combining these techniques allows for the speed of direct execution combined with the security of binary translation.

A virtualization system of course involves more than executing VM instructions—the VMM itself is also a software mechanism defined by instructions and data of its own. For example, the VMM might be a program written in C, compiled to execute on the system hardware platform. At the same time, an application 360 written in a language such as Visual Basic might be running in the VM, whose guest OS may be compiled from a different language.

There must also be some way for the VM to access hardware devices, albeit in a manner transparent to the VM itself. One solution would of course be to include in the VMM all the required drivers and functionality normally found in the host OS 220 to accomplish I/O tasks. Two disadvantages of this solution are increased VMM complexity and duplicated effort—if a new device is added, then its driver would need to be loaded into both the host OS and the VMM. In systems that include a host OS (as opposed to a dedicated kernel such as shown in FIG. 2), a much more efficient method has been implemented by VMware, Inc., in its Workstation product. This method is also illustrated in FIG. 1.

In the system illustrated in FIG. 1, both the host OS and the VMM are installed at system level, meaning that they both run at the greatest privilege level and can therefore independently modify the state of the hardware processor(s). For I/O to at least some devices, however, the VMM may issue requests via the host OS 220. To make this possible, a special driver VMdrv 242 is installed as any other driver within the host OS 220 and exposes a standard API to a user-level application VMapp 500. When the system is in the VMM context, meaning that the VMM is taking exceptions, handling interrupts, etc., but the VMM wishes to use the existing I/O facilities of the host OS, the VMM calls the driver VMdrv 242, which then issues calls to the application VMapp 500, which then carries out the I/O request by calling the appropriate routine in the host OS.

In FIG. 1, the vertical line 600 symbolizes the boundary between the virtualized (VMNMM) and non-virtualized (host software) "worlds" or "contexts." The driver VMdrv 242 and application VMapp 500 thus enable communication between the worlds even though the virtualized world is essentially transparent to the host system software 200.

As described above, a primary advantage of virtual computer systems is the ability to run multiple VMs on a single host computer. Also as mentioned above, each VM may be a software implementation of a complete computer system. At the same time, the host world, comprising the host system software 200 and the applications 260, also constitutes a complete computer system. Thus, in effect, multiple complete virtual computer systems and one complete "real" computer system may run on a single physical computer system at the same time. All of these computer systems must share the same system hardware 100, however.

Various techniques have been used to allow system hardware to be shared between multiple virtual computer systems. For example, the VMM 400 may include a resource manager that switches the CPU(s) 102 between executing the multiple VMs and the host world so that each software entity is given time to execute on the CPU(s) 102. Other hardware resources must also be shared between the multiple VMs and the host world. For example, the system memory 104 and the disk 106 must also be allocated between the VMs and the host system.

Another hardware resource that must generally be shared between the host world and the multiple VMs is an interface to a computer network. Most computers these days have some sort of interface to a computer network, such as to a local area network (LAN) and/or to the global Internet. Many computers have a single network interface card (NIC), such as a standard Ethernet controller or a wireless NIC, for connecting to a computer network. FIG. 1, for example, shows a wireless NIC 108 within the system hardware 100. The wireless NIC 108 may implement a standard wireless networking interface, such as the 802.11a, 802.11b or 802.11g standards from the Institute of Electrical and Electronics Engineers, Inc. (IEEE), for example. Thus, the wireless NIC 108 may be a WUSB11 Wireless USB (Universal Serial Bus) Adapter, for example, from Linksys, a division of Cisco Systems, Inc. Alternatively, the system hardware 100 could have a conventional wired Ethernet controller, such as an Intel PRO/100 Ethernet NIC from Intel Corporation, for example.

Existing virtual machine products of VMware, Inc., the assignee of this application, enable a host world and a plurality of VMs to share a wired NIC to connect to an Ethernet network. For example, the Workstation virtualization software from VMware may be loaded onto a conventional Intel IA-32 computer system with a conventional NIC. The computer system may run a conventional OS, such as a distribution of Linux or a Windows OS from Microsoft Corp., along with a NIC driver that is appropriate for the OS and the NIC. The Workstation software may then be loaded onto the system, and configured to create one or more VMs and to enable the VMs to use the physical NIC to access a network. The Workstation product has three options for connecting a VM to a network: bridged networking, network address translation (NAT), and host-only networking. The bridged networking option is most relevant to this invention. Once the VMs are created, guest system software 320 and applications 360 may be loaded onto the VMs in a substantially conventional manner.

The system architecture of the Workstation product, such as Workstation 4, is substantially similar to the system illustrated in FIG. 1. The Workstation product has a separate instance of the VMM 400 for each VM 300 in the system. Each VMM 400 contains several device emulators 410, one of which is a NIC emulator 411. Each NIC emulator 411 may emulate one or more virtual NICs 308 for its respective VM, as illustrated in FIG. 1. More specifically, in the Workstation product, the NIC emulator 411 emulates an Am79C970A PCnet-PCI II Ethernet controller from Advanced Micro Devices, Inc. A PCnet Lance driver for this NIC is built into all common OSs. FIG. 1 illustrates a NIC driver 348 within the VM 300. The PCnet Lance driver is a specific implementation of the NIC driver 348. Thus, the NIC driver within each of the VMs can be used to access the respective virtual NIC.

Once a VM 300 is created and initialized, and a guest OS 330 is loaded into the VM, the VM can be configured to access a computer network to which the computer system 10 is connected. OSs generally come with a full stack of network software that is sufficient to enable applications to access a network. For example, modern Windows OSs include NIC drivers for common NICs, a Network Driver Interface Specification (NDIS) to support one or more higher level network protocol stacks, and at least one network protocol stack, such as an IP (Internet Protocol) stack. Other NIC drivers, network protocol stacks and other networking software, including possibly one or more intermediate drivers, may also be loaded into the OS to provide additional network capabilities.

In FIG. 1, the guest OS 330 is shown to contain a guest network software package 338, which may generally comprise any software that provides a networking interface between applications and a NIC driver. Hence, in a modern Windows OS, the network software package 338 may comprise the NDIS software and one or more network protocol stacks. The guest network software 338 may be configured in a conventional manner to interface with the NIC driver 348 in a conventional manner to use the virtual NIC 308 to access the computer network. From the perspective of the NIC driver 348, the guest network software 338, the guest OS 330 and the applications 360, the virtual NIC 308 is preferably indistinguishable from a corresponding physical NIC. So, these software entities within the VM 300 may be configured in a conventional manner and they may operate in a convention manner to access the network using the virtual NIC 308.

The NIC emulator 411 provides the functionality of the virtual NIC 308 to the VM 300. As is common practice in virtualization technology, a device emulator can provide an interface between a driver for the emulated device and a corresponding physical device. Here, the NIC emulator 411, possibly along with other software units within the virtual computer system 10, provides an interface between the NIC driver 348 and the physical NIC. The NIC emulator 411 provides the interface to the NIC driver 348 that the NIC driver is expecting from the virtual NIC 308, and the NIC emulator 411 initiates the transfer of network data between the NIC driver 348 and the physical NIC. For example, suppose that the virtual NIC 308 that is emulated by the NIC emulator 411 is a standard NIC that provides direct memory access (DMA) capabilities. Suppose further that an application 360 within the VM 300 generates a data packet for transmission to a destination on the network. The VM's guest network software 338 encapsulates the data packet into one or more Ethernet frames in a conventional manner and forwards the frames to the NIC driver 348. The NIC driver attempts to set up the virtual NIC 308 to perform a DMA transfer of the data frame. The NIC emulator 411 responds to the NIC driver 348 in the manner that the NIC driver 348 expects the virtual NIC 308 to respond. The NIC emulator 411 may copy the data frame to a new location, emulating the expected DMA transfer, or it may cause the physical NIC to perform the expected DMA transfer.

In any case, the data frame is conveyed from the NIC driver 348 to the physical NIC, which then transmits the data frame to the network. One method for conveying data frames between the NIC driver 348 and the physical NIC is described below in connection with a first embodiment of the invention. In any event, the NIC driver 348 thinks that it is interfacing with the virtual NIC 308 and that the virtual NIC 308 is providing a network interface, but the work is actually performed by the physical NIC, along with the NIC emulator 411 and possibly one or more other software units. Various techniques are known in the art for emulating a virtual NIC 308 in this manner to facilitate the transfer of data between the NIC driver 348 and a computer network, using the physical NIC.

In the bridged networking configuration of the Workstation product, each of the virtual NICs in the system is assigned a MAC (Media Access Control) address that is unique, at least within the virtual computer system. In particular, the MAC addresses of the virtual NICs are different from each other and from the MAC address of the physical NIC. The MAC addresses for the virtual NICs may be assigned manually by a user of the computer system, or they may be assigned automatically by the virtualization software. Each VM is generally also assigned a static or dynamic IP address, such as by using a DHCP (Dynamic Host Configuration Protocol) server. The IP address is preferably unique at least within the local network to which the virtual computer system is connected. Each of the VMs in the computer system may preferably use its respective MAC address and IP address in a conventional manner, just like a "real" computer system, to communicate with the host computer and other computers that are accessible through the network, along with other network devices and entities.

Any entity, either hardware or software, that may be accessed through an attached network, will generally be referred to as a "network entity." Network entities may include, for example, a computer attached to the local network or to a remote network, a network printer or other network device, or a VM running in a remote computer. As described below, this invention may be implemented in a virtual computer system in which a virtual network is implemented within the host physical computer system, giving network access to other VMs running within the same physical computer system, as well as to software entities within the host world of the physical computer system. Accordingly, network entities may also include other VMs running on the same physical computer system, as well as software entities within the host world of the same physical computer system.

Suppose first that a wired Ethernet controller is used within the physical hardware 100. This wired Ethernet controller may be set up in a promiscuous mode, so that, as is well known, the controller passes all incoming data frames received from the network through to the networking software of the computer system, regardless of the MAC address contained in the destination field of the Ethernet headers. Also, wired Ethernet controllers generally pass all outgoing data frames from the networking software of the computer system onto the network, regardless of the MAC address that is contained in the source field of the Ethernet headers.

Using these characteristics of a wired NIC, the Workstation product enables data to be transferred between a VM within a virtual computer system and other network entities accessible through an attached network. Thus, for example, the VM 300 can send data, encapsulated into an IP data packet, containing the VM's IP address in the source address field of the IP header, to its virtual NIC 308, using its NIC driver 348. First, the guest network software 338 encapsulates the packet into one or more Ethernet frames, inserting the MAC address of the virtual NIC 308 into the source address field. The Ethernet frame is then forwarded to the NIC driver 348, which attempts to send it to the virtual NIC 308. The NIC emulator 411 causes the Ethernet frame to be conveyed to the physical, wired NIC, which then transmits the data frame onto the network, still containing the MAC address of the virtual NIC 308 in the source address field. The data frame is then routed to the appropriate network entity in a conventional manner.

The network entity may respond to the data frame, and send another data frame back to the virtual machine 300, using the IP address of the VM 300 and the MAC address of the virtual NIC 308 as the respective destination addresses for the data frame. The computer network(s) route the data frame from the network entity to the system 10, based on the IP address and the MAC address. The physical NIC retrieves the data frame from the network and, because the NIC is in promiscuous mode, passes it on to the networking software within the system 10, even though it does not contain the MAC address of the physical NIC. The data frame is conveyed from the physical NIC to the NIC driver 348, in a manner that makes it appear as if the frame were received from the network by the virtual NIC 308. Again, a method for conveying data frames between the physical NIC and the NIC driver 348 is described below in connection with a first embodiment of the invention. The NIC driver 348 passes the data frame on to the guest network software 338, which strips the Ethernet header and IP header from the data frame. The guest network software 338 then forwards the data to the appropriate application within the VM 300 in a conventional manner. The same technique can be used to enable other VMs in the system to access the computer network using the physical, wired NIC, but using a MAC address that is unique to the corresponding virtual NIC and an IP address that is unique to the VM.

Applications in the host world can also access the computer network, using the physical, wired NIC in a conventional manner. The host OS 220 includes a host network software package 222 that provides one or more network protocol stacks within the host OS, just like the guest network software 338 provides one or more network protocol stacks within the guest OS. The host OS 220 also includes a host NIC driver that is appropriate to the host OS and the physical NIC. The host network software 222 interfaces with the host NIC driver to use the physical NIC to communicate with other computers accessible through the network. These network communications in the host world use the MAC address of the physical NIC and the IP address of the host computer. The physical NIC transfers data frames between the network and the host NIC driver in a conventional manner. Of course, the physical NIC has no problem transferring data frames that contain its own MAC address in either the source field or the destination field. Thus, the multiple virtual computers and the host world are all able to share access to the computer network using the single physical NIC, but with each computer using its own MAC address and its own IP address.

This same approach does not work in all situations, however. For example, the approach generally does not work if the system hardware 100 has a wireless NIC 108, as illustrated in FIG. 1, instead of a wired NIC. The wireless NIC 108 typically interfaces with a wireless access point that implements the same wireless standard as the wireless NIC. For example, if the wireless NIC is the Linksys WUSB11 Wireless USB Adapter, as mentioned above, the NIC might interface with a Linksys WAP11 Wireless Network Access Point. With such wireless interfaces, standard Ethernet data frames are transmitted over a radio frequency (RF) communication link between the wireless NIC 108 and the wireless access point.

Applications in the host world can communicate with other network entities through the wireless access point using the MAC address of the wireless NIC 108. The host world can send various Ethernet data frames to remote network entities using the MAC address of the wireless NIC 108 in the source address field of the Ethernet data frames, and remote network entities can send various Ethernet data frames to the host world using the MAC address of the wireless NIC 108 in the destination address field of the Ethernet data frames. It is known, however, that such a communication link generally cannot be established using a MAC address that does not match the MAC address of the wireless NIC 108. Thus, the VM 300 cannot establish such a communication link through the wireless access point using the MAC address of the virtual NIC 308. Only the MAC address of the wireless NIC 108 may be used to establish such a connection.

What is needed, therefore, is a method for enabling multiple virtual computers, or a physical computer and one or more virtual computers, to share a physical network connection when there is a limitation on the use of network physical addresses, such as when the network connection consists of a typical wireless network interface.

SUMMARY OF THE INVENTION

The invention comprises a first method for sharing a network connection between a first software entity and a second software entity, where the network connection connects a single physical computer system to a computer network, with both software entities executing within the single physical computer system. The first method comprises: allowing the first software entity to use the network connection using a first lower layer network address and a first higher layer network address; allowing the second software entity to attempt to use the network connection using a second lower layer network address and a second higher layer network address, where the second lower layer network address is different from the first lower layer network address and the second higher layer network address is different from the first higher layer network address; for an outgoing data frame from the second software entity to the computer network, replacing an occurrence of the second lower layer network address within the outgoing data frame with the first lower layer network address, so that the data frame appears to have originated from a network entity using the first lower layer network address and the second higher layer network address; and, for an incoming data frame from the computer network, if the data frame is addressed using the first lower layer network address and the second higher layer network address, replacing the first lower layer network address with the second lower layer network address and conveying the data frame toward the second software entity, so that, after modification, the incoming data frame appears to have been addressed to the second software entity, using the second lower layer network address and the second higher layer network address.

In some embodiments of the first method of the invention, the first software entity is a host software system and the second software entity is a virtual machine. Also in some embodiments, the lower layer network addresses are Ethernet addresses and the higher layer network addresses are Internet Protocol addresses. Also in some embodiments, if the outgoing data frame comprises a Dynamic Host Configuration Protocol (DHCP) request, the method further comprises setting a broadcast bit in the DHCP request to indicate that any reply to the DHCP request is to be broadcast, instead of being unicast. Also in some embodiments, if the outgoing data frame comprises a DHCP request, the method further comprises replacing an occurrence of the second lower layer network address in a chaddr field of the DHCP request with the first lower layer network address and placing the second lower layer network address into a client identifier extension of the DHCP request. Also in some embodiments, if the incoming data frame comprises a DHCP reply, the method further comprises replacing the first lower layer network address in the incoming data frame with a lower layer network address from a client identifier extension of the DHCP reply. Also in some embodiments, if the incoming data frame comprises a DHCP reply, the method further comprises replacing the first lower layer network address in the incoming data frame with a lower layer network address that is determined based on correlating a transaction identifier value with a prior outgoing DHCP request. Also in some embodiments, if the outgoing data frame comprises an Address Resolution Protocol (ARP) request, the method further comprises replacing an occurrence of the second lower layer network address within the ARP request with the first lower layer network address. Also in some embodiments, if the outgoing data frame comprises a Reverse Address Resolution Protocol (RARP) request, the method further comprises replacing an occurrence of the second lower layer network address within the RARP request with the first lower layer network address.

The invention also comprises a second method for sharing a network connection between a first software entity and a second software entity, where the network connection connects a single physical computer system to a computer network, where the network connection has a first layer 2 address associated therewith, and where both software entities execute within the single physical computer system. The second method comprises: allowing the first software entity to attempt to use the network connection using a second lower layer network address and a second higher layer network address, where the second lower layer network address is different from the first lower layer network address; allowing the second software entity to attempt to use the network connection using a third lower layer network address and a third higher layer network address, where the third lower layer network address is different from the first lower layer network address and from the second lower layer network address, and the third higher layer network address is different from the second higher layer network address; for an outgoing data frame from the first software entity to the computer network, replacing an occurrence of the second lower layer network address within the outgoing data frame with the first lower layer network address, so that the data frame appears to have originated from a network entity using the first lower layer network address and the second higher layer network address; for an outgoing data frame from the second software entity to the computer network, replacing an occurrence of the third lower layer network address within the outgoing data frame with the first lower layer network address, so that the data frame appears to have originated from a network entity using the first lower layer network address and the third higher layer network address; for an incoming data frame from the computer network, if the data frame is addressed using the first lower layer network address and the second higher layer network address, replacing the first lower layer network address with the second lower layer network address and conveying the data frame toward the first software entity, so that, after modification, the incoming data frame appears to have been addressed to the first software entity, using the second lower layer network address and the second higher layer network address; and, for an incoming data frame from the computer network, if the data frame is addressed using the first lower layer network address and the third higher layer network address, replacing the first lower layer network address with the third lower layer network address and conveying the data frame toward the second software entity, so that, after modification, the incoming data frame appears to have been addressed to the second software entity, using the third lower layer network address and the third higher layer network address.

In some embodiments of the second method of the invention, the first software entity is a host software system and the second software entity is a virtual machine. Also in some embodiments, the first software entity is a first virtual machine and the second software entity is a second virtual machine.

The invention also comprises a third method for sharing a network connection between a host software system and a virtual machine, where the network connection connects a single physical computer system to a computer network, with the host software system and the virtual machine both executing within the single physical computer system, and with a first layer 2 address being associated with the network connection. The third method comprises: allowing the host software system to use the network connection using the first layer 2 address and a first layer 3 address; allowing the virtual machine to attempt to use the network connection using a second layer 2 address and a second layer 3 address, where the second layer 2 address is different from the first layer 2 address and the second layer 3 address is different from the first layer 3 address; for an outgoing data frame from the virtual machine to the computer network, replacing an occurrence of the second layer 2 address within the outgoing data frame with the first layer 2 address, so that the data frame appears to have originated from a network entity using the first layer 2 address and the second layer 3 address; and, for an incoming data frame from the computer network, if the data frame is addressed using the first layer 2 address and the second layer 3 address, replacing the first layer 2 address with the second layer 2 address and conveying the data frame toward the virtual machine, so that, after modification, the incoming data frame appears to have been addressed to the virtual machine, using the second layer 2 address and the second layer 3 address.

In some embodiments of the third method of the invention, the computer system further includes one or more additional virtual machines that are also allowed to share the network connection, with each virtual machine having a layer 2 address that is unique among layer 2 addresses within the physical computer system and a layer 3 address that is unique among layer 3 addresses within the physical computer system, and the method further comprises maintaining a table for correlating layer 2 addresses with layer 3 addresses for the multiple virtual machines. Also in some embodiments, if a virtual machine sends an outgoing data frame using a third layer 2 address and a third layer 3 address as source addresses, and the table does not contain an entry correlating the third layer 3 address with the third layer 2 address, the method further comprises adding an entry to the table that correlates the third layer 3 address with the third layer 2 address. Also in some embodiments, if the destination addresses of an incoming data frame contain the first layer 2 address and a layer 3 address that matches an entry in the table, the method further comprises replacing the first layer 2 address with the layer 2 address from the matching entry in the table. Also in some embodiments, the layer 2 addresses are Ethernet addresses and the layer 3 addresses are Internet Protocol addresses. Also in some embodiments, the network connection comprises a wireless network interface card. Also in some embodiments, the network connection comprises a plurality of network interface cards and a network interface card (NIC) teaming solution. Also in some embodiments, the computer system further includes one or more additional virtual machines that are also allowed to share the network connection, with the multiple virtual machines being interconnected by a virtual network within the computer network. Also in some embodiments, the virtual network comprises a virtual switch.

BRIEF DESCRIPTION OF THE DRAWINGS

FIG. 8 is a table showing, for the first, second and third embodiments of the invention, the contents of address fields for both the header and the message body for incoming and outgoing data frames containing query and reply messages for three different address resolution protocols.

DETAILED DESCRIPTION

The invention may be advantageously implemented in a wide variety of situations, four of which are described below, three related to the use of a wireless NIC and one related to the use of multiple NICs and a NIC teaming solution. The invention relates to the sharing of a network interface by multiple VMs or by a host computer system and one or more VMs. The invention may be implemented in connection with a wide variety of different types of network interfaces and a wide variety of virtual computer systems. The computer system in which the invention is implemented may be connected to one or more networks, including a wide variety of different types of networks. In the description below, when reference is made to a single network, a possible interconnection of multiple networks should generally be inferred. The invention is also described in connection with an Ethernet-based network interface, but it may also be implemented in connection with other networking technologies. Also, the invention is described in connection with IP network communications (including TCP (Transmission Control Protocol), UDP (User Datagram Protocol), etc.), but it may also be implemented in connection with other network protocols. Also, two specific implementations of the invention are described in connection with the NDIS network software from Microsoft Corporation, but the principles described below can be implemented by a person of skill in the art in systems using other network software.

The preferred embodiments are described in connection with the virtual computer system illustrated in FIG. 1, but the invention may also be implemented in a wide variety of other virtual computer systems. Also, reference is made to the Workstation product of VMware, Inc. While the invention may be implemented in the Workstation product, the invention is certainly not limited to such an implementation. Although the Workstation product has the general architecture illustrated in FIG. 1, references to the virtual computer system illustrated in FIG. 1 generally should not be limited to the implementation in the Workstation product. Also, the term "data," as used herein, should generally be interpreted very broadly, to include any content that may be conveyed across a network, including data, as used in a more strict sense, and messages, requests, responses, and any other content that may be conveyed using a network protocol. Finally, in the description below, when data is said to be "conveyed," this term should be interpreted to possibly include the common practice of conveying a pointer to data, without requiring any copying or movement of the actual data. A person of skill in the art will understand, based on the particular implementation, when it is both possible and advantageous to pass a pointer from one entity to another, instead of copying or moving the data.

Figure 1:
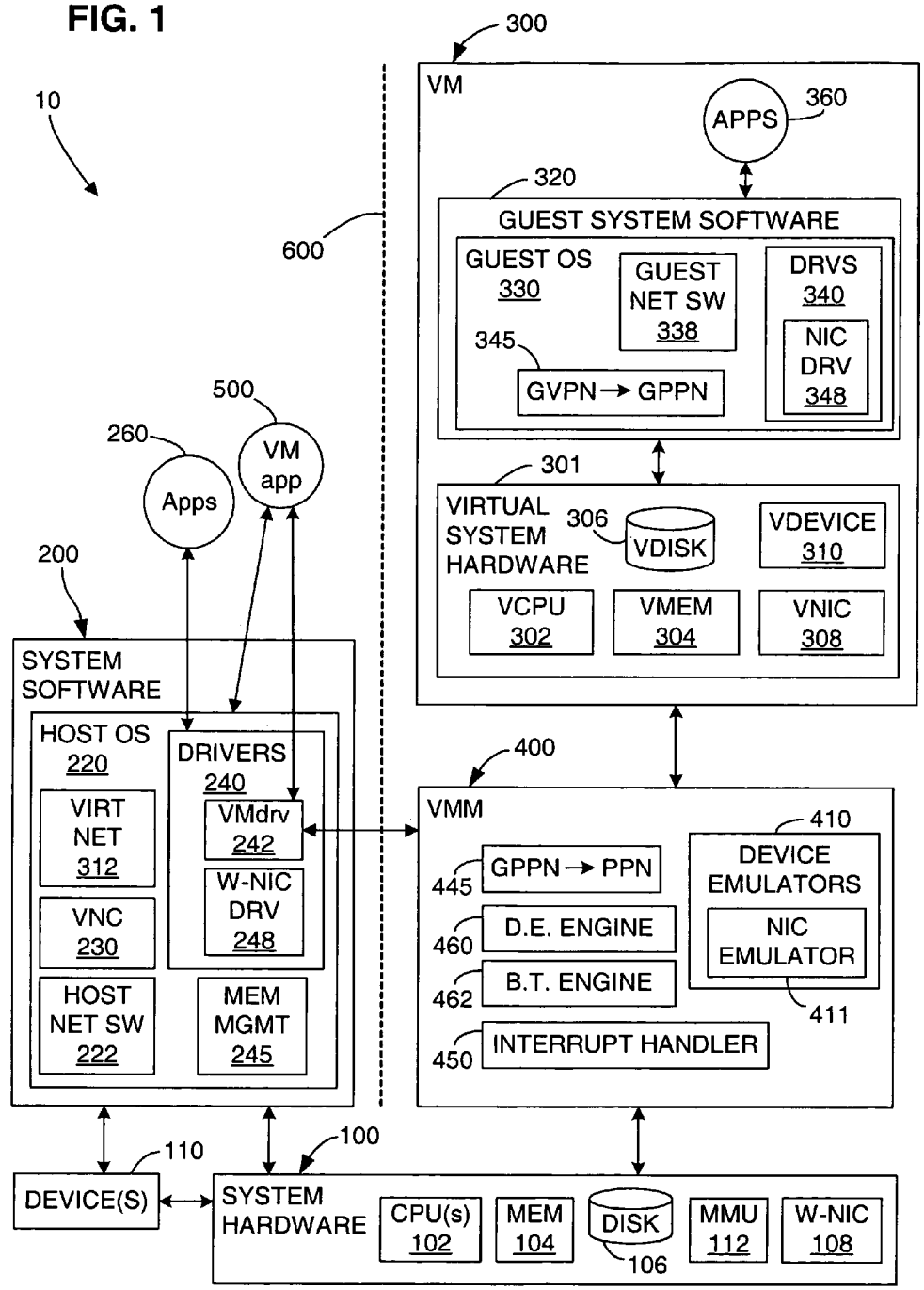
FIG. 1 illustrates a virtual computer system installed on a host platform, with a virtual machine monitor (VMM) at the same system level as the host operating system.

As described above, the system hardware 100 of the system 10 of FIG. 1 includes the wireless NIC 108, which may be a Linksys WUSB11 Wireless USB Adapter, for example. The host OS 220 includes a wireless NIC driver 248 that is appropriate for the NIC 108 and the host OS 220. The host OS 220 also includes the host network software 222, as described above. The network software 222, the NIC driver 248 and the NIC 108 constitute a conventional network interface that may be configured and used in a conventional manner to provide network access to the host world of the system 10.

Figure 3:
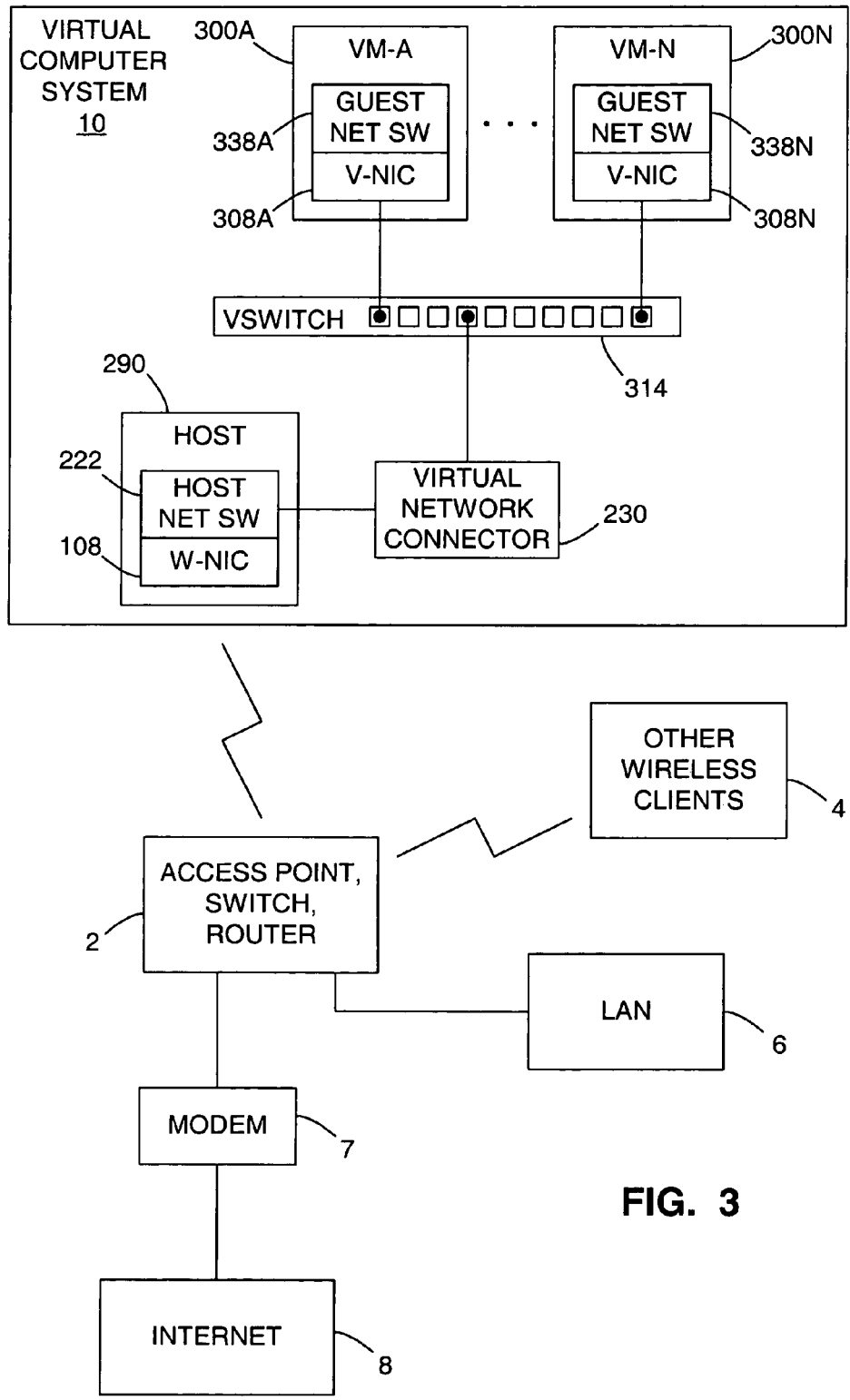
FIG. 3 illustrates a high-level configuration diagram for a computer network that includes a virtual computer system in which this invention may be implemented.

Also as described above, the NIC 108 may interface with a wireless access point, such as a Linksys WAP11 Wireless Network Access Point. The wireless access point may then connect to one or more of various other network components, such as a switch, a router or a hub, to link the computer system 10 and other wireless clients to one or more networks. FIG. 3 shows one example of a network configuration with which the NIC 108 may interface. In this example, the NIC 108 interfaces with an access point 2 that also includes the functions of a switch and a router. The access point 2 may be a Linksys BEFW11S4 Wireless-B Broadband Router, for example. The access point 2 may also be connected to the global Internet 8 through a cable modem 7, using the routing function, and to a LAN 6 using the switching function. FIG. 3 also shows that other wireless clients 4 may interface with the access point 2. The network configuration of FIG. 3 is just one of many different network configurations with which the NIC 108 may interface. As another example, instead of interfacing with the access point 2, the NIC 108 could interface directly with a wireless NIC of another computer system using a known "ad hoc" mode. This invention could be used in such an arrangement to enable one or more network entities within each computer system to communicate with one another using distinct MAC addresses and IP addresses.

As further shown in FIG. 3, a virtual network may also be implemented inside the virtual computer system 10. FIG. 3 shows a host 290, which represents the host world described above in connection with FIG. 1. Thus, the host 290 generally comprises the applications 260, the VMapp 500, the system software 200 and the host world's share of the system hardware 100 and the devices 110. In particular, the host 290 includes the host network software 222 and the wireless NIC 108, as shown in FIG. 3, as well as the wireless NIC driver 248, which is not illustrated in FIG. 3 for simplicity. The host network software 222, the wireless NIC driver 248 and the wireless NIC 108 constitute a conventional network interface that may be configured and used in a conventional manner, as described above. The virtual network within the virtual computer system 10 further comprises a virtual network connector (VNC) 230, a virtual switch 314 and a plurality of VMs 300A to 300N.

Each of the VMs 300A to 300N comprises a virtual NIC 308, a driver 348 for the virtual NIC (not shown for simplicity), and a guest network software package 338. For example, as illustrated in FIG. 3, the VM 300A comprises a virtual NIC 308A and a guest network software package 338A, while the VM 300N comprises a virtual NIC 308N and a guest network software package 338N. For each VM 300A to 300N, the respective network software 338, NIC driver 348 and virtual NIC 308 also constitute a conventional network interface, except that the NIC is virtual instead of physical. However, the virtual NIC preferably functions in a manner that is indistinguishable from a physical NIC from the perspective of the network software 338 and the NIC driver 348. Hence, the network interface for each of the VMs 300A to 300N may nonetheless be configured and used in a conventional manner to provide network access to the respective VM 300A to 300N.

The virtual switch 314 is a simple example of a virtual network 312 that may be implemented within the virtual computer system 10 for providing network connections between the multiple VMs 300A to 300N and with the host 290. Other virtual network components may also be added to this virtual network 312, including additional virtual switches. Each of the VMs 300A to 300N may also include multiple virtual NICs, if desired. Multiple virtual switches and other virtual network devices may be interconnected with each other and with the virtual NICs of the VMs 300A to 300N in a wide variety of different configurations, to create a wide variety of complex or simple virtual networks. The possibilities for interconnecting these virtual network devices may be substantially similar to corresponding possibilities for interconnecting physical network devices. A straightforward user interface may be provided to enable a user to create virtual network devices and to configure them into a desired virtual network. FIG. 1 shows the virtual network 312 within the host OS 220. To simplify the following description, in the example of FIG. 3, the virtual network 312 consists of just the virtual switch 314.

In very general terms, the virtual switch 314 operates in software in a manner that is analogous to a physical network switch. The switch 314 receives data frames from the VMs 300A to 300N and from the VNC 230 and forwards them to one or more network entities, based on the MAC address contained in the destination address field of the frame. For example, if the VM 300A sends a data frame to the switch 314 containing the MAC address of the VM 300N in the destination address field, then the switch 314 forwards the data frame to the VM 300N. If the VM 300N sends a data frame to the switch 314 containing the network broadcast address in the destination address field, then the switch 314 forwards the data frame to all other devices connected to the switch 314, including the VM 300A and the VNC 230. If the switch 314 receives a data frame from the VNC 230 that is addressed to one of the VMs 300A to 300N, the switch 314 forwards the data frame to the appropriate VM 300A to 300N. Also, if the switch 314 receives a data frame containing a MAC address for which it does not know the location of the appropriate destination entity, the switch 314 may broadcast the data frame to all ports, except for the port from which the data frame originated. Also, any data frame from any of the VMs 300A to 300N that is addressed to the host 290, using the MAC address of the wireless NIC 108 is forwarded to the VNC 230. Also, any data frame from any of the VMs 300A to 300N that is addressed to any network entity that can or might be reached through the access point 2 is also forwarded to the VNC 230. The switch 314 may also or alternatively implement other functions that are not implemented in a typical physical switch, but that are possible and advantageous in a virtual computer setting. For example, if a virtual NIC, such as the virtual NIC 308A, is placed in promiscuous mode, the switch 314 may be notified of this setting and the switch 314 may forward to the VM 300A additional data frames that would not otherwise be forwarded to the VM 300A. For example, the switch 314 may forward to the VM 300A all data frames that it receives from any other source, regardless of whether the data frames contain a broadcast address, the unicast address of the virtual NIC 308A, or a specified multicast address. Also, if the switch 314 receives a data frame containing a MAC address for which it does not know the location of the appropriate destination entity, the switch 314 may nonetheless refrain from conveying the data frame to any of the VMs 300A to 300N, under the assumption that the switch 314 knows the MAC address of each of the virtual NICs 308.

The VNC 230 provides an interface between the virtual switch 314 and the host network software 222. The VNC 230 and the virtual switch 314 may alternatively be combined into a single unit. The implementation of the VNC 230 depends on the structure and function of the host network software 222, and the interfaces provided by the network software 222. The VNC 230 interfaces with the network software 222 to route data frames between respective sources and destinations. If a data frame from the switch 314 is addressed to the host 290, using the MAC address of the wireless NIC 108, then the VNC 230 interfaces with the host network software 222 to deliver the data frame to the appropriate application 260 within the host 290, as if the data frame had arrived at the wireless NIC 108. Conversely, if an application 260 sends a data frame to a VM 300A to 300N, the host network software 222 delivers the data frame to the VNC 230. The VNC 230 then forwards the data frame to the switch 314 for routing to the appropriate VM 300A to 300N. If a data frame arrives at the VNC 230 from the switch 314 that is destined for a device that is, or may be, accessible through the access point 2, then the VNC 230 uses the host network software 222 to transmit the data frame to the access point 2, using the wireless NIC 108. Conversely, if a data frame that is destined for a VM 300A to 300N arrives at the wireless NIC 108 from the access point 2, the host network software 222 forwards the data frame to the VNC 230. The VNC 230 forwards the data frame to the switch 314, which forwards the data frame to the appropriate VM 300A to 300N.

Figure 4A:
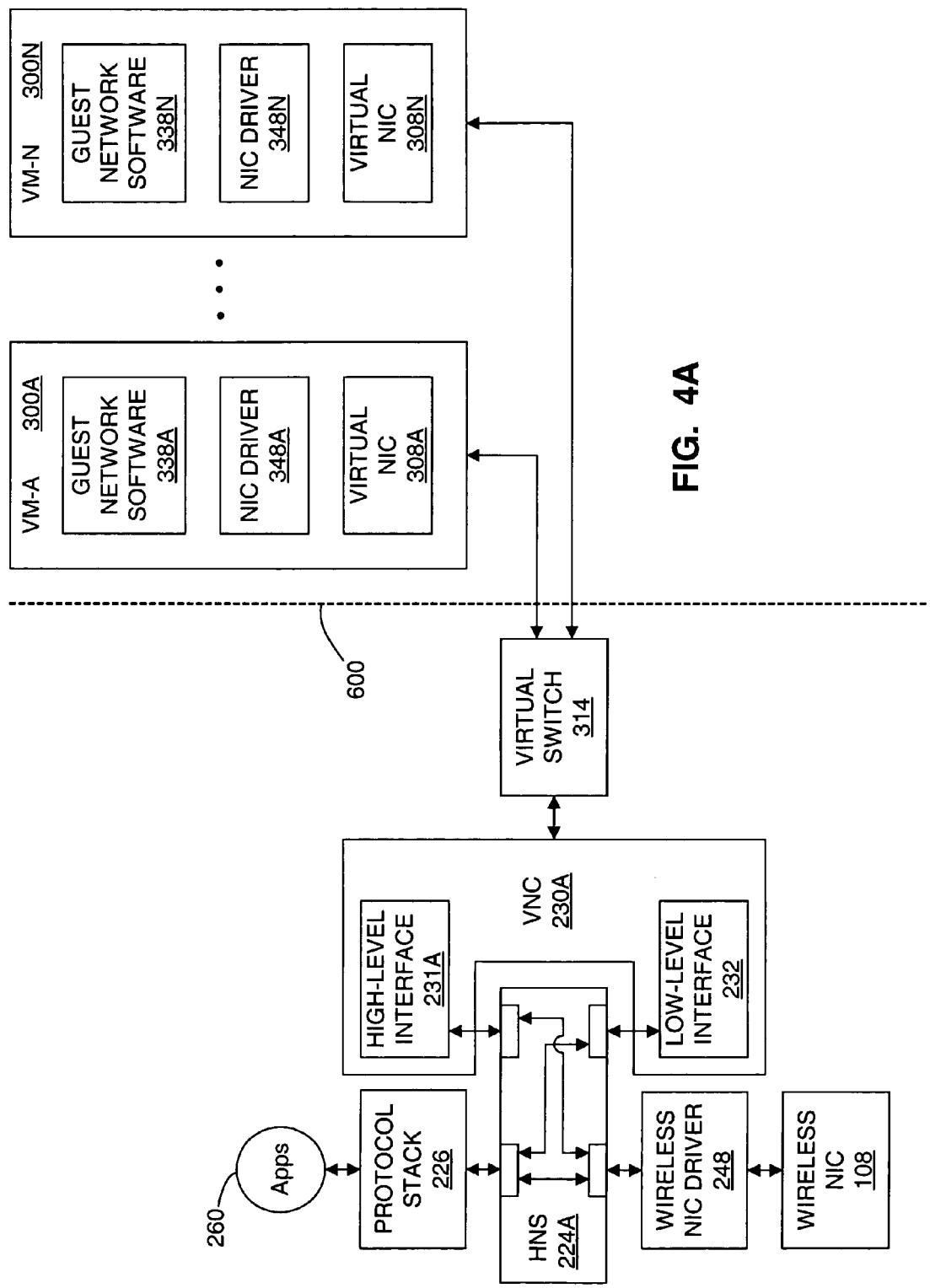
FIG. 4A illustrates a general configuration for networking components within a virtual computer system, which includes a wireless NIC and in which a first embodiment of the invention is implemented.

FIG. 4A illustrates in greater detail, one implementation of the VNC 230, namely a VNC 230A, for the virtual computer system of FIG. 1. The VNC 230A is a general implementation, which illustrates the theory behind the interaction between the VNC 230 and the host network software 222. The implementation of FIG. 4A may be adapted in various ways for use in a variety of virtual computer systems, such as in a system based on a Linux host OS 220. For a modern Windows OS, however, a different implementation of the VNC 230, namely a VNC 230B or a VNC 230C, is preferably used, as described below in connection with FIGS. 4B and 4C, respectively.

FIG. 4A illustrates the VMs 300A to 300N, with each VM comprising a virtual NIC 308, a NIC driver 348 and a guest network software package 338. For example, the VM 300A comprises the virtual NIC 308A, the NIC driver 348A and the guest network software package 338A, while the VM 300N comprises the virtual NIC 308N, the NIC driver 348N and the guest network software package 338N. FIG. 4A also illustrates the virtual switch 314, the wireless NIC driver 248, the wireless NIC 108 and the host applications 260, all of which have been described above in connection with other figures.

FIG. 4A also illustrates a host network subsystem (HNS) 224A and a protocol stack 226, which are constituent parts of the host network software 222 illustrated in FIGS. 1 and 3. The host network software 222 may also include additional protocol stacks, but a single protocol stack will be discussed below for simplicity. The protocol stack 226 may be a conventional protocol stack, such as a common IP protocol stack. The HNS 224A comprises software that provides an interface between protocol stacks, such as the protocol stack 226, and network device drivers, such as the wireless NIC driver 248. For example, in a Linux OS, the HNS comprises various modules and data structures in the Linux kernel that provide an interface between the network protocol stacks and the network device drivers. The HNS 224A generally provides a high-level API for interfacing with protocol stacks, such as the protocol stack 226, along with a low-level API for interfacing with network device drivers, such as the wireless NIC driver 248. The protocol stack 226 uses functions in the high-level API of the HNS 224A when sending a data frame to the wireless NIC 108 for transmission, and the protocol stack 226 provides functions for use by the HNS 224A when a data frame is received at the wireless NIC 108 that is destined for one of the applications 260. Also, the wireless NIC driver 248 provides functions for use by the HNS 224A when a data frame is to be sent to the wireless NIC 108 for transmission, and the wireless NIC driver 248 uses functions in the low-level API of the HNS 224A when a data frame is received at the wireless NIC 108.

Thus, when an application 260 sends data for transmission by the wireless NIC 108, the protocol stack 226 encapsulates the data into one or more IP data packets and then into one or more Ethernet data frames and conveys the data frames to the HNS 224A using the high-level API of the HNS. The HNS 224A then uses the low-level API to convey the data frames to the wireless NIC driver 248, which conveys the data frames to the wireless NIC 108 for transmission. Conversely, when a data frame is received at the wireless NIC 108 that is destined for one of the applications 260, the wireless NIC 108 conveys the data frame to the wireless NIC driver 248, which conveys the data frame to the HNS 224A, using the low-level API of the HNS. The HNS 224A conveys the data frame to the protocol stack 226 using the high-level API. The protocol stack 226 then removes the payload data from the data frame and delivers the data to the appropriate application 260.

As can be seen from the above description, data frames are conveyed between host applications 260 and network entities accessible through the wireless NIC 108 in a conventional manner. The protocol stack 226 and the wireless NIC driver 248 interface with the HNS 224A in a conventional manner to establish and implement a network connection between the applications 260 and network entities accessible through the wireless NIC 108. For example, in a Linux OS, the protocol stack 226 registers with the HNS 224A to receive desired network traffic, and the wireless NIC driver 248 registers with the HNS 224A to facilitate transferring network traffic between the HNS 224A and the wireless NIC 108. Host applications 260 establish and use socket connections in a conventional manner to communicate with network entities.

Reference is now made to FIGS. 1 and 4A in describing in greater detail the conveyance of data frames (a) between host applications 260 and the VMs 300A to 300N and (b) between the VMs 300A to 300N and network entities accessible through the wireless NIC 108. For simplicity, the following descriptions address the conveyance of data that are encapsulated into a single IP data packet, which is further encapsulated into a single Ethernet data frame, although, as is well known, a single set of data may be split into multiple IP data packets, which may be further split into a larger number of Ethernet data frames. Also, as mentioned above, the concepts described below may also be applied to other network protocols and technologies.

First, let's look at the conveyance of data frames between host applications 260 and the VMs 300A to 300N. Suppose first that a host application 260 has data to be sent to the VM 300A. From the perspective of the host application 260, the VM 300A appears to be accessible through the wireless NIC 108 just like other network entities that are accessible through the access point 2 of FIG. 3. So the host application 260 conveys the data to the protocol stack 226 in a conventional manner. The protocol stack 226 encapsulates the data into an IP packet and then into an Ethernet frame in a conventional manner and conveys the data frame to the HNS 224A in a conventional manner. Instead of, or in addition to, conveying the data frame to the wireless NIC driver 248, the HNS 224A conveys the data frame to the VNC 230A.

The VNC 230A comprises a high-level interface 231A and a low-level interface 232. The low-level interface 232 interfaces with the low-level API provided by the HNS 224A, and is analogous to the corresponding interface provided by the NIC driver 248. To some extent, the VNC 230A emulates a network device driver through the low-level interface 232. The VNC 230A registers with the HNS 224A according to the low-level API of the HNS, so that network traffic from the host applications that is destined for one of the VMs 300A to 300N is forwarded to the low-level interface 232 of the VNC 230A, instead of, or in addition to, the wireless NIC driver 248.

Returning to the description of conveying a data frame from a host application 260 to the VM 300A, after the HNS 224A conveys the data frame to the VNC 230A, the VNC 230A further conveys the data frame to the virtual switch 314. The virtual switch 314 then determines that the data frame is addressed to the VM 300A. From here, the data frame must cross the boundary 600 between the non-virtualized world and the virtualized worlds. The virtual switch 314 conveys the data frame to the VM driver 242, also indicating that the data frame is to be conveyed to the VM 300A. Execution will switch from the host world to a virtual world as described above. During this context switch, the VM driver 242 conveys the data frame, using shared memory, to the VMM 400 corresponding to the VM 300A. Alternatively, depending on the particular implementation, the VMapp 500 may read or copy the data frame from the virtual switch 314 and then copy the data frame into memory that is shared with the VM 300A, prior to a context switch to the virtual world. In either case, the NIC emulator 411 conveys the data frame to the NIC driver 348A, as if the data frame had been received at the virtual NIC 308A. The NIC driver 348A and the guest network software 338A then forward the data in a conventional manner to the appropriate application within the VM 300A, based on the port to which the data was sent, and possibly the IP address of the host computer.

Now suppose that the application within the VM 300A responds to the same host application 260 with another set of data. The guest network software 338A encapsulates the data into an IP data packet and then an Ethernet data frame, and then sends the data frame to the NIC driver 348A in a conventional manner. The NIC driver 348A conveys the data frame to the virtual NIC 308A. The NIC emulator 411 emulates the virtual NIC 308A in conveying the data frame toward the host world. The NIC emulator 411 conveys the data frame to the VM driver 242 during a switch to the host world, again using shared memory. The VM driver 242 conveys the data frame to the virtual switch 314. Alternatively, again depending on the particular implementation, the NIC emulator 411 may copy the data frame into shared memory, and the VMapp 500 may copy the data frame to the virtual switch 314, after a context switch to the host world. In either case, the virtual switch 314 conveys the data frame to the VNC 230A. The VNC 230A determines that the data frame is to be forwarded to the host, and conveys the data frame to the HNS 224A using the low-level interface 232. The HNS 224A conveys the data frame to the protocol stack 226 in a conventional manner, and the protocol stack 226 conveys the data frame to the appropriate host application in a conventional manner, again based on the port to which the data frame was addressed, and possibly the IP address of the VM 300A. The host application 260 receives the data frame in the same manner as if the data frame had arrived at the wireless NIC 108.

Now suppose that a guest application within the VM 300A has a set of data to be sent to a network entity that is accessible through the access point 2. The data is encapsulated into an IP data packet and then an Ethernet data frame and conveyed to the VNC 230A in the same manner as described above for data that is being transmitted from the VM 300A to a host application 260. The VNC 230A determines that the data frame is to be forwarded to the wireless NIC 108. A data frame heading in this direction through the VNC 230A is referred to as an "outgoing" data frame. At this point, the VNC 230A may modify the outgoing data frame in a manner described below in connection with FIGS. 5A and 7A. In some embodiments of the invention, the VNC 230A may actually modify a copy of the original data frame conveyed to the virtual NIC 308A by the NIC driver 348A, to ensure that none of the VMs 300A to 300N can detect that the data frame has been modified. This alternative of modifying a copy of the data frame may be used, for example, when a shared buffer is used to convey data frames between the HNS 224A and the VNC 230A. Next, the VNC 230A conveys the possibly modified data frame to the HNS 224A. However, this time the VNC 230A uses the high-level interface 231A, instead of the low-level interface 232.

The high-level interface 231A interfaces with the high-level API provided by the HNS 224A, and is analogous to the corresponding interface provided by the protocol stack 226. The VNC 230A registers with the HNS 224A according to the high-level API of the HNS, so that network traffic from the wireless NIC 108 that is destined for one of the VMs 300A to 300N is forwarded to the high-level interface 231A of the VNC 230A, instead of, or in addition to, the protocol stack 226. For example, the VNC 230A may register to receive all network traffic received at the wireless NIC 108.

Returning to the description of conveying a data frame from a guest application in the VM 300A to a network entity accessible through the access point 2, the HNS 224A conveys the possibly modified data frame in a conventional manner from the high-level interface 231A of the VNC 230A to the wireless NIC driver 248. The wireless NIC driver 248 conveys the data frame in a conventional manner to the wireless NIC 108, which conveys the data frame to the access point 2 in a conventional manner. Finally, the data frame is conveyed from the access point 2 to the addressed network entity in a conventional manner.

Figure 5A:
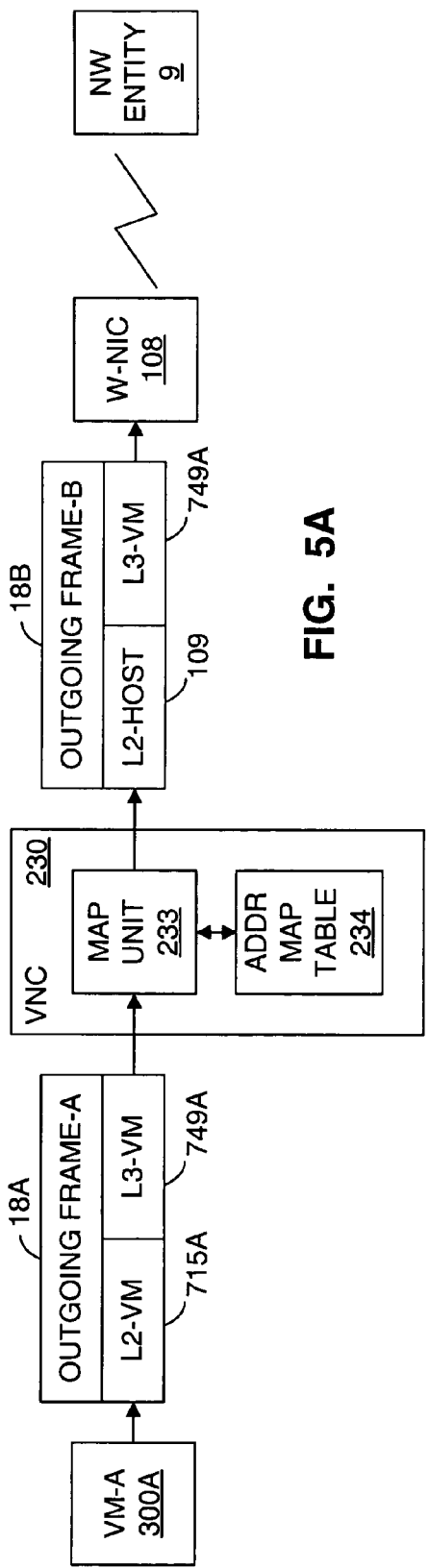
FIG. 5A illustrates a method and apparatus for conveying a basic outgoing network data frame from a VM to a network entity, according to the first, second and third embodiments of the invention.
Figure 7A:
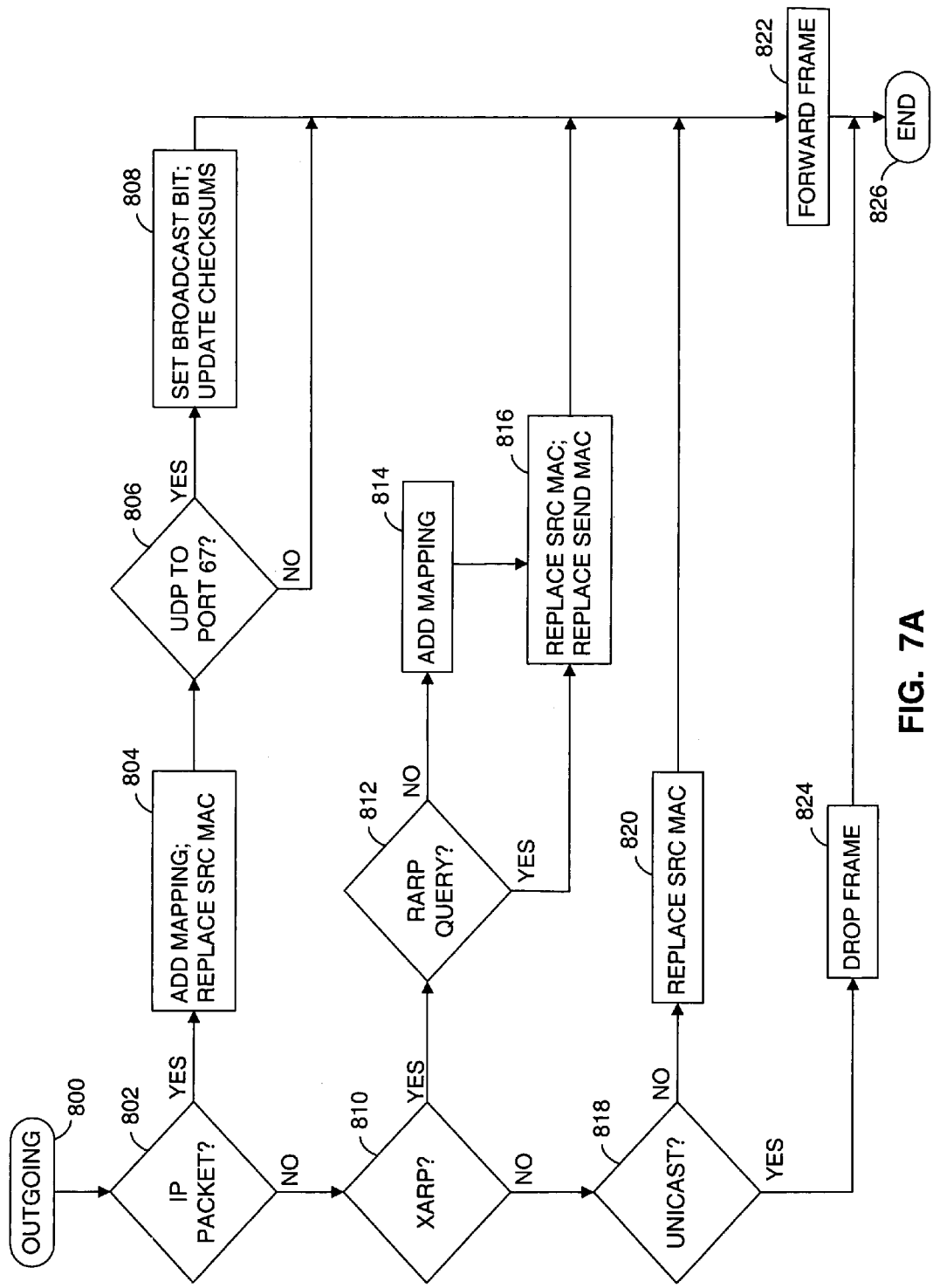
FIG. 7A illustrates a method for processing outgoing network data frames within a virtual network connector in the first, second and third embodiments of the invention.

Referring now to FIG. 5A, one possible modification of an outgoing data frame by the VNC 230, including possibly the first VNC 230A, the second VNC 230B, the third VNC 230C or some other VNC 230, is illustrated. The process illustrated in FIG. 5A may be selectively applied to some types of data frames, but not to all types. An outgoing data frame to which the process of FIG. 5A is applied will be referred to as a "basic" outgoing data frame. A more detailed algorithm for processing outgoing data frames is described below in connection with FIG. 7A. FIG. 7A also provides information regarding the types of data frames to which the process of FIG. 5A is preferably applied.

As shown in FIG. 5A, the VM 300A generates an outgoing data frame 18A and conveys the data frame to the VNC 230, as described above. At this point, the original data frame 18A contains the MAC address 715A of the virtual NIC 308A in the source MAC address field and the IP address 749A of the VM 300A in the source IP address field. More broadly, the data frame contains the layer 2 address 715A of the virtual NIC 308A in the source layer 2 address field and the layer 3 address 749A of the VM 300A in the source layer 3 address field, where "layer 2" and "layer 3" are references to the well known seven layer OSI (Open System Interconnection) reference model, which is standard 7498 of the International Electrotechnical Commission (IEC) of the International Organization for Standardization (ISO). A layer 2 address may also be referred to as a hardware address or a physical address, while a layer 3 address may also be referred to as a network address.

Figures 2, 6:
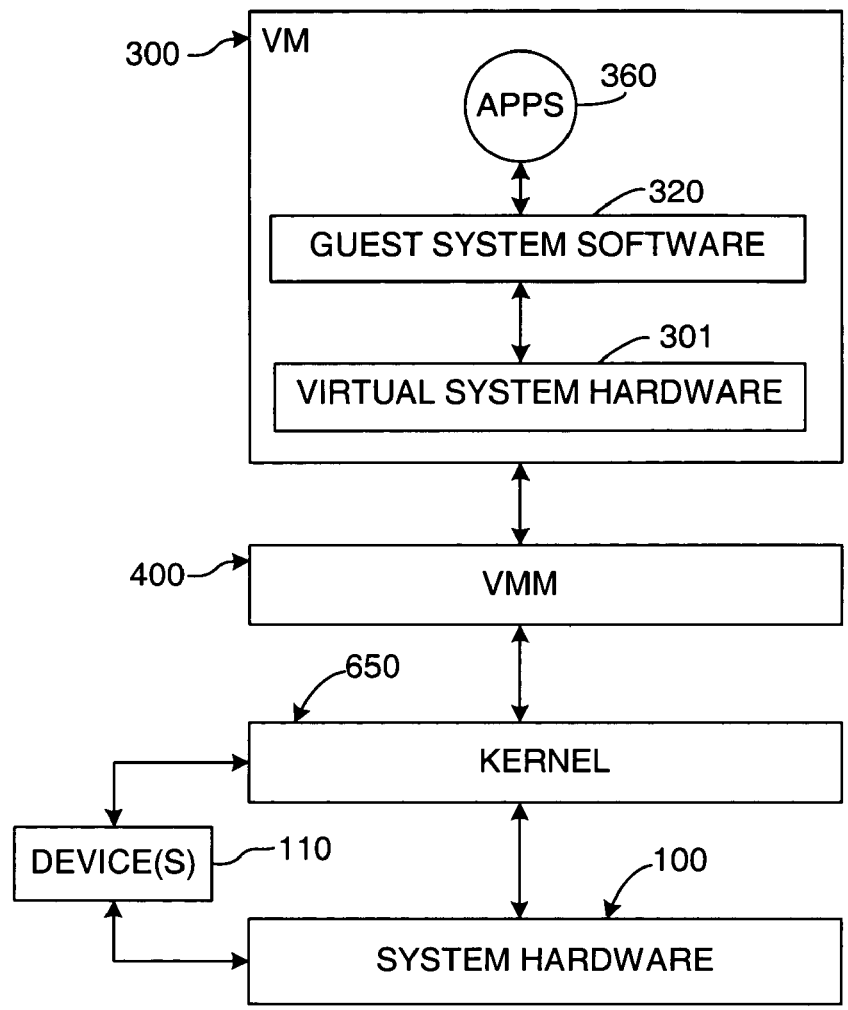
FIG. 2 illustrates an alternative configuration of a virtual computer system, which includes a kernel on which the VMM runs.
FIG. 6 illustrates an address-mapping table that is implemented in the first, second and third embodiments of the invention.

As shown in FIG. 5A, the VNC 230 also comprises a mapping unit 233 and an address mapping table 234. The address mapping table 234 is shown in greater detail in FIG. 6. The address mapping table 234 includes a number of entries mapping layer 2 addresses for virtual NICs of VMs to layer 3 addresses for the corresponding VMs. Each entry includes a layer 2 address 715 and one or more (or possibly zero) layer 3 addresses 749, as well as possibly a timestamp 751 and a transaction ID (identifier) 743. Thus, for example, the table 234 may include an entry for the VM 300A that would indicate the MAC address 715A of the virtual NIC 308A and the IP address 749A of the VM 300A, along with possibly a timestamp value 751A and a transaction ID value 743A. As described above, this invention may also be used with other types of layer 2 and layer 3 addresses. This includes using multiple types of layer 2 addresses and multiple types of layer 3 addresses at the same time. In this case, the entries of the address mapping table 234 may also include one or more additional values to indicate the types of layer 2 and/or layer 3 addresses stored in the entry. As an example, the address mapping table may include some entries that include layer 3 addresses according to the Internet Protocol version 4 and other entries that include layer 3 addresses according to the Internet Protocol version 6, along with a value for each entry indicating which type of layer 3 address is contained in the entry.

When the VNC 230 receives a basic outgoing data frame, the mapping unit 233 checks to see if there is an entry in the mapping table 234 that contains the layer 2 and layer 3 addresses contained in the source address fields of the data frame. In some embodiments of the invention, the address mapping table 234 is a hash table so that a desired entry can be discovered more quickly. Also, some embodiments of the invention may cache one or more of the most recent entries to the table to further speed up the process of determining whether the table already contains a specific mapping. If the mapping table contains an entry that matches the layer 2 and layer 3 source addresses of the outgoing data frame, then the timestamp for the entry may be updated according to the present time or according to some other time value, such as the system uptime. In an embodiment that caches one or more entries, a timestamp in the table may not be updated at the reception of each packet related to the entry, and may instead be updated only when the entry is replaced in the cache by another entry. If there is no entry that matches the layer 2 and layer 3 source addresses of the outgoing data frame, then a new entry is inserted into the table, including the layer 2 and layer 3 source addresses from the outgoing data frame, along with a current timestamp. The timestamps may be used to delete older entries according to some algorithm, such as deleting the oldest entry once the size of the table reaches some threshold value. The optional use of transaction IDs is described below.

For a basic outgoing data frame, the mapping unit 233 modifies the outgoing data frame by replacing the MAC address 715A of the virtual NIC 308A in the source address field with the MAC address 109 of the wireless NIC 108, to create a modified outgoing data frame 18B. However, the IP address in the source address field of the modified outgoing data frame 18B remains that of the VM 300A. As described above, the modified data frame 18B is conveyed to the wireless NIC 108 and then to the addressed network entity 9, through the access point 2 (not shown in FIG. 5A).

Now if the network entity 9, to which the outgoing data frame was addressed, responds to the data frame from the VM 300A and sends another data frame back to the VM 300A, the network entity 9 addresses the return data frame using the MAC address 109 of the wireless NIC 108 and the IP address 749A of the VM 300A. The network entity 9 uses the IP address 749A of the VM 300A because it was contained in the source IP address field of the outgoing data frame, as received by the network entity 9. The network entity 9 will typically already have an entry in its Address Resolution Protocol (ARP) table correlating the IP address 749A of the VM 300A with the MAC address 109 of the wireless NIC 108. Accordingly, the network entity 9 will address the responsive data frame using the MAC address 109 of the wireless NIC 108 and the IP address 749A of the VM 300A. When the return data frame reaches the access point 2, the access point 2 detects the MAC address 109 of the wireless NIC 108 in the destination field of the Ethernet frame and transmits the data frame across the wireless link. The wireless NIC 108 receives the data frame from the access point 2 and conveys the data frame to the wireless NIC driver 248 in a conventional manner, and the wireless NIC driver 248 conveys the data frame to the HNS 224A in a conventional manner. The HNS 224A conveys the data frame to the high-level interface 231A of the VNC 230A instead of, or in addition to, conveying the data frame to the protocol stack 226.

At this point, the VNC 230A may modify the return data frame. A data frame heading in this direction through the VNC 230 is referred to as an "incoming" data frame. Here, the VNC 230, which may be the first VNC 230A, the second VNC 230B, the third VNC 230C or some other VNC 230, may modify the incoming data frame in a manner illustrated in FIGS. 5B and 7B. In one embodiment of the invention, again, the VNC 230 may actually modify a copy of the return data frame to ensure that the modification of the data frame cannot be detected, this time by the HNS 224.

Figure 5B:
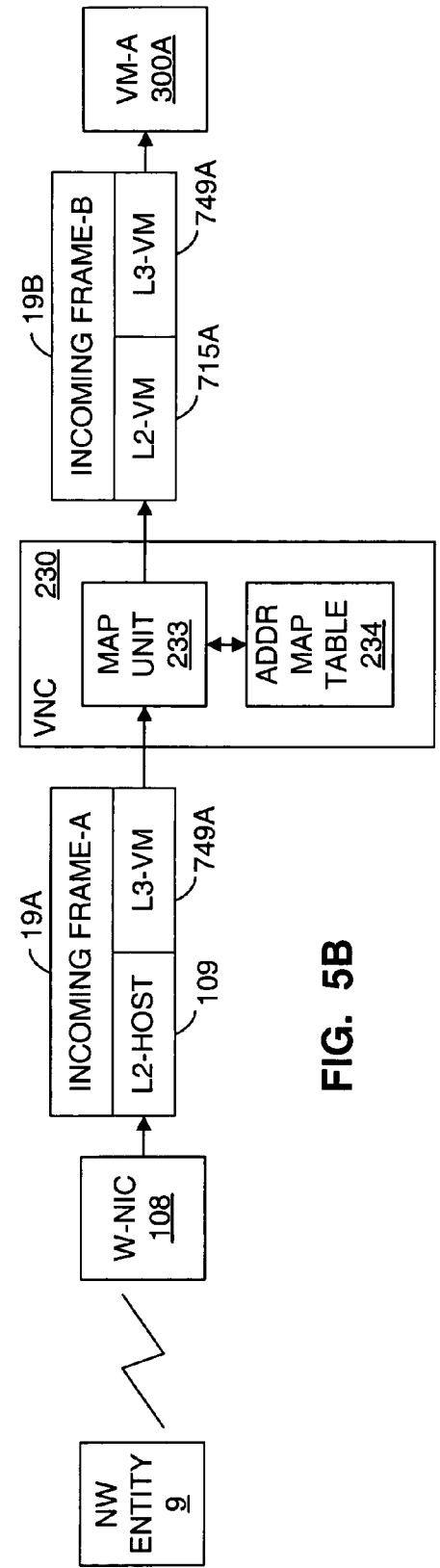
FIG. 5B illustrates a method and apparatus for conveying a basic incoming network data frame from a network entity to a VM, according to the first, second and third embodiments of the invention.

Referring now to FIG. 5B, one possible modification of an incoming data frame by the VNC 230 is illustrated. The process illustrated in FIG. 5B applies to a unicast IP data packet for which the IP address contained in the destination address field is contained in the address mapping table 234. An incoming data frame to which the process of FIG. 5B is applied will be referred to as a "basic" incoming data frame. A more detailed algorithm for processing incoming data frames is described below in connection with FIG. 7B.

As illustrated in FIG. 5B, the network entity 9 generates the incoming data frame 19A and sends it off to the VM 300A. The access point 2 (not shown in FIG. 5B) transmits the data frame 19A to the wireless NIC 108 and the data frame 19A is conveyed to the VNC 230. At this point, the incoming data frame 19A contains the MAC address (or layer 2 address) 109 of the wireless NIC 108 in the destination layer 2 address field and the IP address (or layer 3 address) 749A of the VM 300A in the destination layer 3 address field. If the incoming data frame 19A contains a unicast IP data packet, the mapping unit 233 uses the destination IP address in the incoming data frame to search for a matching entry in the address mapping table 234. If the mapping unit 233 finds a matching entry, the mapping unit 233 replaces the destination MAC address of the incoming data frame with the MAC address listed in the entry in the address mapping table 234. In this case, the mapping unit 233 replaces the MAC address 109 of the wireless NIC 108 in the destination address field with the MAC address 715A of the virtual NIC 308A, to create a modified incoming data frame 19B. Next, the VNC 230 conveys the possibly modified data frame to the virtual switch 314 (not shown in FIG. 5B), and the data frame is subsequently conveyed from the virtual switch 314 to the VM 300A in the same manner as described above for data that is being transmitted from a host application 260 to the VM 300A.

When the incoming data frame arrives at the VM 300A, it contains the MAC address 715A of the virtual NIC 308A and the IP address 749A of the VM 300A in the destination address fields. The NIC emulator 411 conveys the data frame to the NIC driver 348A in the same manner as if the data frame had arrived at the virtual NIC 308A. From the perspective of the NIC driver 348A, the guest network software 338 and the guest applications 360, it appears that the data frame was sent in a conventional manner from the network entity 9, using the MAC address and the IP address of the VM 300A as destination addresses. The VM 300A preferably cannot determine that the source address of the outgoing data frame was modified to use the MAC address of the wireless NIC 108 or that the destination address of the incoming data frame was modified in a converse manner. More broadly, the modification of incoming and outgoing data frames is preferably not detectable within any of the VMs 300A to 300N, and the modification of the data frames preferably does not significantly interfere with the network communications of the host 290 or any other network entity.

Figure 7B:
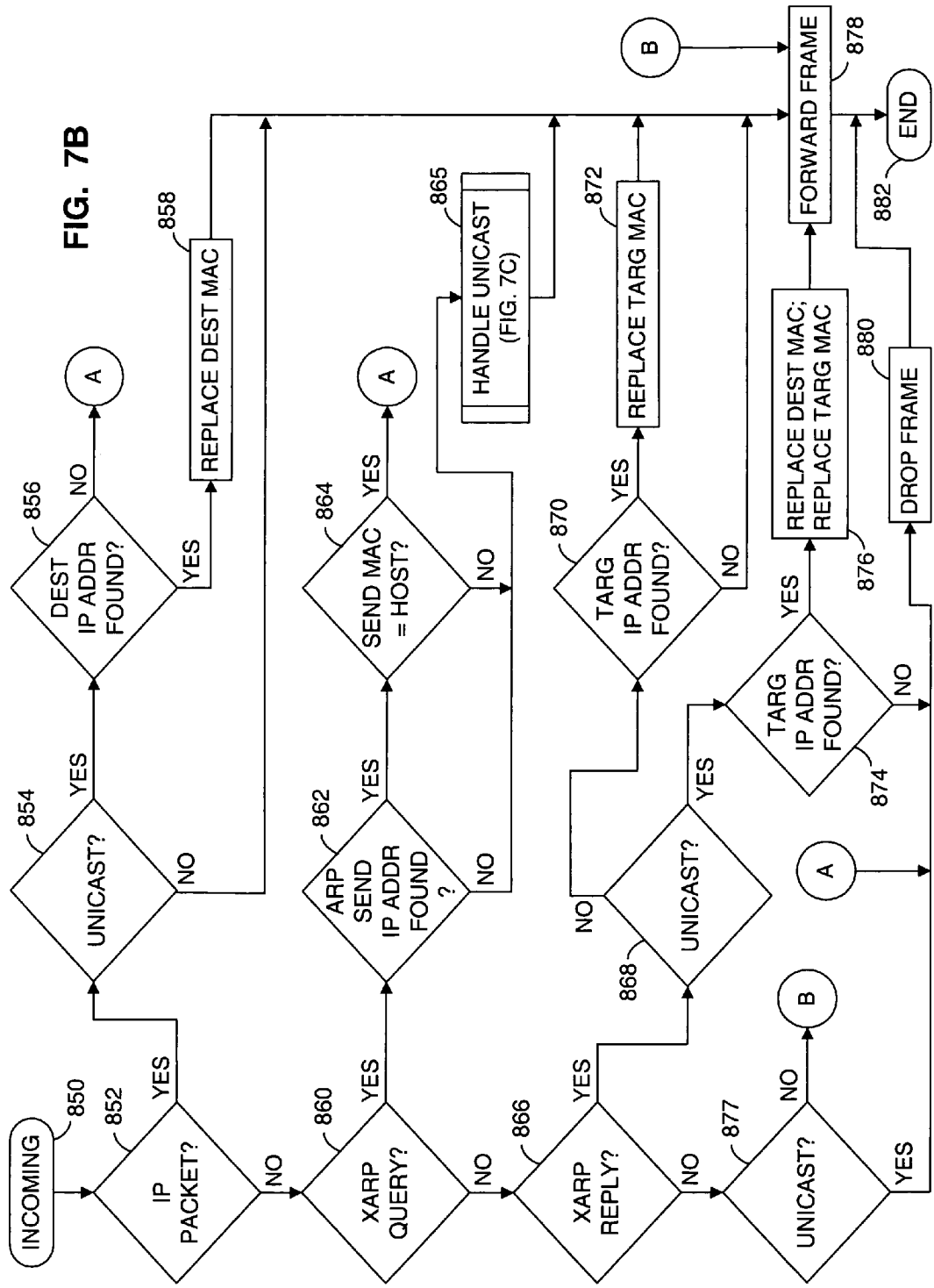
FIG. 7B illustrates a method for processing incoming network data frames within a virtual network connector in the first, second and third embodiments of the invention.

As described above, outgoing data frames conveyed from the VMs 300A to 300N to a network entity accessible through the wireless NIC 108 are processed according to the processes illustrated in FIGS. 5A and 7A, and incoming data frames conveyed from a network entity accessible through the wireless NIC 108 to the VMs 300A to 300N are processed according to the processes illustrated in FIGS. 5B and 7B, while data frames conveyed between host applications 260 and the VMs 300A to 300N are not processed according to these processes. In alternative embodiments, however, the processes of FIGS. 5A and 7A are also applied by the VNC 230 to data frames that are conveyed from the VMs 300A to 300N to the host applications 260 ("outgoing" data frames), and the processes of FIGS. 5B and 7B are also applied by the VNC 230 to data frames that are conveyed from the host applications 260 to the VMs 300A to 300N ("incoming" data frames). These alternative embodiments may be implemented in any of the configurations illustrated in FIGS. 4A, 4B and 4C, as well as other possible configurations. In some configurations, the VNC 230 may not be able to distinguish data frames that are being conveyed to or from the host applications 260 from data frames that are being conveyed to or from network entities that are accessible through the wireless NIC 108. In this case, the processes illustrated in FIGS. 5A and 7A must be applied to outgoing data frames that pass through the VNC 230 and the processes illustrated in FIGS. 5B and 7B must be applied to outgoing data frames that pass through the VNC 230, regardless of whether the data frames are being conveyed to or from the host applications 260 or whether the data frames are being conveyed to or from network entities that are accessible through the wireless NIC 108.

Referring again to FIG. 4A, there are generally six different types of network traffic flow between the various network sources and destinations within, or accessible to, the virtual computer system 10, namely (1) from an application within the host 290 to a network entity accessible through the wireless NIC 108, (2) from a network entity accessible through the wireless NIC 108 to an application within the host 290, (3) from an application within the host 290 to a VM 300A to 300N, (4) from a VM 300A to 300N to an application within the host 290, (5) from a VM 300A to 300N to a network entity accessible through the wireless NIC 108, and (6) from a network entity accessible through the wireless NIC 108 to a VM 300A to 300N. A data frame addressed to the broadcast address or to a multicast address may constitute multiple types of network traffic flow. For example, a broadcast data frame from the host 290 is conveyed to the VMs 300A to 300N and to network entities accessible through the wireless NIC 108, constituting network traffic flow of both the first type and the third type.

Now, the VNC 230A and the HNS 224A (or, more generally, the VNC 230 and a HNS 224) are responsible for conveying data between the respective sources and destinations. In effect, the VNC 230 and the HNS 224 can be viewed collectively as some sort of logical switch or hub, having three ports. The HNS 224 receives data frames from the protocol stack 226 and must convey them on either toward the VMs 300A to 300N or toward the wireless NIC 108, or both, depending on the layer 2 and/or layer 3 destination addresses in the data frames, and depending on the protocol preferences specified by the high-level interface 231A. The HNS 224 also receives data frames from the wireless NIC 108 and must convey them on either toward the VMs 300A to 300N or toward the host 290, or both, again depending on the layer 2 and/or layer 3 destination addresses in the data frames, and depending on the protocol preferences specified by the protocol stack 226 and the high-level interface 231A. Also, the VNC 230 receives data frames from the virtual switch 314 and must convey them on either toward the host 290 or toward the wireless NIC 108, or both, again depending on the layer 2 and/or layer 3 destination addresses in the data frames, and depending on the protocol preferences specified by the protocol stack 226.

This task of conveying data frames between the respective sources and destinations may be accomplished in a variety of different ways, using a variety of different implementations for both the HNS 224 and the VNC 230. For example, the HNS 224 and the VNC 230 may be configured to effectively implement a hub, so that a data frame that is received at one port is conveyed to each of the other ports regardless of the port through which the destination may be reached. In this case, each of the ports of the "hub" will receive superfluous data frames that are not addressed to any network entity that is accessible through the respective port. Each of the ports may respond in various ways to such superfluous data frames. The wireless NIC 108 will typically transmit all outgoing data frames it receives, whether the frames are superfluous or not. The protocol stack 226, on the other hand, may simply drop any data frames that are not addressed to any of the host applications 260. Similarly, the virtual switch 314 may be implemented with sufficient intelligence to drop any data frames that are not addressed to any of the VMs 300A to 300N. Each of these ports may also be configured in other manners, however, depending on the implementation.

In many possible implementations of the invention, the conveyance of superfluous data frames is not significantly detrimental to the operation of the virtual computer system or to the networks to which the computer system is connected. However, the conveyance and handling of superfluous data frames consumes processing resources and network resources. Accordingly, for some implementations, it may be desirable to limit or eliminate such superfluous data frames. The conveyance of superfluous data frames can be limited by adding intelligent filtering and routing functionality to the HNS 224 and/or to the VNC 230.

The HNS 224 may be modified to intelligently filter and route data frames received from the protocol stack 226 to either the VNC 230 or to the wireless NIC driver 248, but not indiscriminately to both. When the HNS 224 receives a data frame from the protocol stack 226, the HNS can determine the layer 2 and/or layer 3 destination addresses from the data frame. If the HNS recognizes the destination address(es) as belonging to one of the VMs 300A to 300N, the HNS may convey the data frame to the VNC 230, and not to the wireless NIC driver 248. If the HNS 224 recognizes the destination address(es) as belonging to a network entity accessible through the wireless NIC 108, the HNS may convey the data frame to the wireless NIC driver 248, and not to the VNC 230. If the HNS does not recognize the destination address(es), the HNS may convey the data frame to both the VNC 230 and the wireless NIC driver 248. If a data frame contains a broadcast or multicast destination address, the data frame may also be forwarded to both the VNC 230 and the wireless NIC driver 248.

Intelligent filtering and routing functionality may also be incorporated into the VNC 230. The VNC 230 may also determine the layer 2 and/or layer 3 destination address(es) from any data frames received from the virtual switch 314. If a data frame contains the MAC address of the wireless NIC 108 in the destination MAC address field, the VNC 230 may forward the data frame to the HNS 224 through the low-level interface 232. The HNS 224 may automatically forward any data frames received from the low-level interface 232 through to the protocol stack 226, and not to the wireless NIC driver 248. If a data frame contains a unicast address other than the MAC address of the wireless NIC 108, the VNC 230 may forward the data frame to the HNS 224 through the high-level interface 231A, or more generally, a high-level interface 231. The HNS 224 may automatically forward any data frames received from the high-level interface 231 through to the wireless NIC driver 248, and not to the protocol stack 226. If a data frame contains a broadcast or multicast address, the VNC 230 may forward the data frame to the HNS 224 through both the high-level interface 231 and the low-level interface 232, so that the data frame is conveyed to both the protocol stack 226 and the wireless NIC driver 248. Alternatively, the HNS 224 may be configured to convey data frames having broadcast or multicast addresses to both the protocol stack 226 and the wireless NIC driver 248, whether the data frames arrived through the high-level interface 231 or the low-level interface 232. In this case, the VNC 230 may convey a data frame containing a broadcast or multicast address to the HNS 224 through either the high-level interface 231 or the low-level interface 232.

Finally, the HNS 224 may also be modified to intelligently filter and route data frames received from the wireless NIC driver 248 between the virtual switch 314 and the protocol stack 226. Again, when the HNS 224 receives a data frame from the wireless NIC driver 248, the HNS 224 can determine the layer 2 and/or layer 3 destination addresses from the data frame. In this case, the layer 2 address will always be a broadcast address, a multicast address or the unicast address of the wireless NIC 108. If a data frame contains a broadcast address or a multicast address, the HNS 224 may convey the data frame to both the protocol stack 226 and to the VNC 230 through the high-level interface 231. However, if the data frame contains the MAC address of the wireless NIC 108, the data frame may be destined for either a host application 260 or to one of the VMs 300A to 300N. In this case, the HNS 224 may also refer to the layer 3 destination address to determine the destination for the data frame. If the HNS 224 recognizes the destination IP address as belonging to one of the VMs 300A to 300N, the HNS 224 may convey the data frame to the VNC 230 through the high-level interface 231, and not to the protocol stack 226. If the HNS 224 recognizes the destination IP address as belonging to the host world 290, the HNS 224 may convey the data frame to the protocol stack 226, and not to the VNC 230. If the HNS 224 does not recognize the destination IP address, the HNS 224 may convey the data frame to both the protocol stack 226 and the VNC 230 through the high-level interface 231.

Each of the intelligent filtering and routing techniques described above is optional for limiting the number of superfluous data frames, with the possible implementation of each technique being independent of the implementation of the other techniques. Other such techniques are also possible. Various other modifications are also possible as well. For example, the functionality of the VNC 230 may be incorporated into the HNS 224, including implementing the methods of FIGS. 5A and 5B.

Figure 4B:
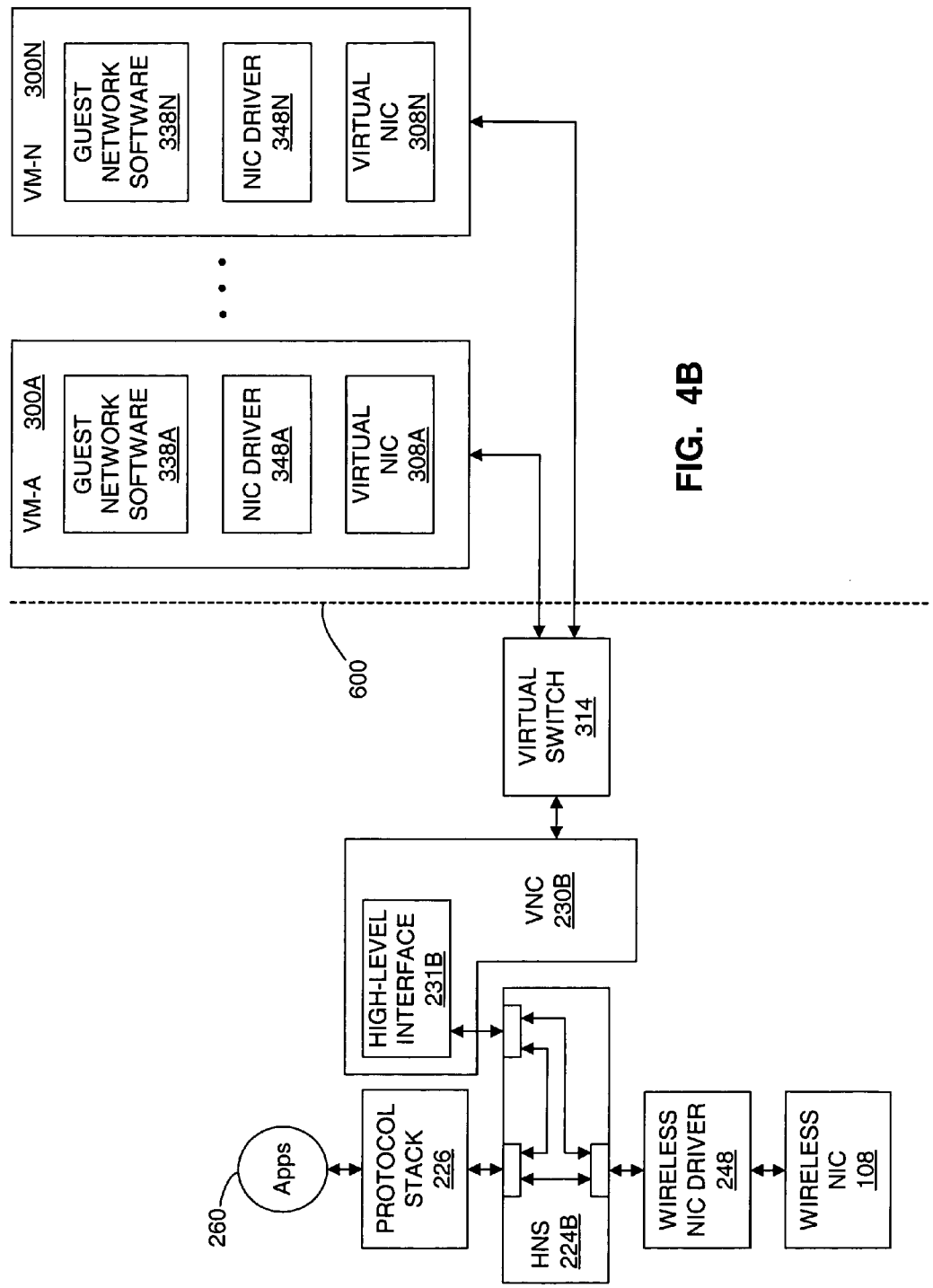
FIG. 4B illustrates a general configuration for networking components within a virtual computer system, which includes a wireless NIC and in which a second embodiment of the invention is implemented.

FIG. 4B illustrates a specific implementation of the HNS 224 and the VNC 230 that may be advantageously used when the host OS 220 comprises a modern Windows OS. Specifically, FIG. 4B includes the VNC 230B, which is an implementation of the VNC 230, and a HNS 224B, which is an implementation of the HNS 224. The VNC 230B includes a high-level interface 231B, which is an implementation of the high-level interface 231. All of the other elements of FIG. 4B may be substantially the same as the elements described above relative to FIG. 4A. For example, the protocol stack 226 may be a standard IP protocol stack that is included in a modern Windows OS, and the wireless NIC driver 248 may be a conventional NIC driver that is appropriate for both the wireless NIC 108 and the particular Windows OS.

For a modern Windows OS, the HNS 224B comprises the NDIS (Network Driver Interface Specification). One aspect of the NDIS 224B that is relevant to implementing this invention is that the NDIS can loop back network traffic from one protocol stack to another. The VNC 230B uses this aspect of the NDIS 224B, and eliminates the low-level interface 232 of the VNC 230A. Instead, the VNC 230B provides only the high-level interface 231B to interface with the NDIS 224B. The high-level interface 231B interfaces with the high-level API provided by the NDIS 224B, and is analogous to the corresponding interface provided by the protocol stack 226. In the terminology used by Microsoft for its NDIS API, the high-level interface 231B implements a lower edge interface of a "NDIS protocol driver." The VNC 230B may operate in substantially the same manner as the VNC 230A, except that the VNC 230B conveys all outgoing data frames to the NDIS 224B using the high-level interface 231B and receives all incoming data frames from the NDIS 224B using the high-level interface 231B, instead of also using a low-level interface 232.

The protocol stack 226 registers with the NDIS 224B in a conventional manner to receive all desired traffic, typically including broadcast traffic, unicast traffic addressed to the MAC address of the wireless NIC 108 and traffic addressed to zero or more multicast addresses. The VNC 230B registers with the NDIS 224B, through the high-level interface 231B, to receive all traffic. Based on the registration by the protocol stack 226, the NDIS 224B conveys to the protocol stack 226 all desired data frames that are received by the NDIS 224B either from the wireless NIC driver 248 or the VNC 230B, and, based on the registration by the VNC 230B, the NDIS 224B conveys to the VNC 230B all data frames that are received by the NDIS 224B either from the wireless NIC driver 248 or the protocol stack 226.

Any data frames conveyed to the NDIS 224B from the protocol stack 226 are generally conveyed both to the VNC 230B and to the wireless NIC driver 248, regardless of the network entity to which the data frames are addressed. Any data frames conveyed to the NDIS 224B from the VNC 230B are generally conveyed to the wireless NIC driver 248, regardless of the network entity to which the data frames are addressed, and they may also be conveyed to the protocol stack 226, depending on the traffic for which the protocol stack has registered. Similarly, any data frames conveyed to the NDIS 224B from the wireless NIC driver 248 are generally conveyed to the VNC 230B, regardless of the network entity to which the data frames are addressed, and they may also be conveyed to the protocol stack 226, again depending on the traffic for which the protocol stack has registered. Thus, the NDIS 224B operates as a logical switching device that has some intelligent filtering and routing functionality. Nonetheless, the protocol stack 226, the VNC 230B and the wireless NIC driver 248 will each generally receive superfluous unicast data frames.

All data frames received at the wireless NIC driver 248 from the NDIS 224B are typically conveyed to the wireless NIC 108 and then transmitted to the access point 2 in a conventional manner, regardless of the network entity to which the data frames are addressed. Thus, superfluous data frames will typically be transmitted by the wireless NIC 108. In many situations, however, the transmission of these superfluous data frames will not have an unacceptably adverse effect on the operation of the virtual computer system or the networks to which the computer system is connected.

The VNC 230B will also receive superfluous data frames, more specifically data frames that are sent from a host application 260 to a network entity that is accessible through the wireless NIC 108, along with data frames that are sent from a network entity that is accessible through the wireless NIC 108 to a host application 260. The VNC 230B may be implemented with enough intelligence to detect and drop such superfluous data frames, or it may simply pass them onto the virtual switch 314, which will not convey them any further anyways. These superfluous data frames also will usually not have an overly adverse effect on the operation of the virtual computer system.

Finally, the protocol stack 226 will also receive superfluous data frames, more specifically data frames that are sent from a network entity that is accessible through the wireless NIC 108 to a VM 300A to 300N. Such superfluous data frames again will often not have any significant adverse effects on the operation of the virtual computer system because the destination IP addresses contained in the data frames will not match the IP address(es) of the host applications 260, and so the data frames will simply be discarded. However, in some situations, in some implementations, the protocol stack 226 may have an adverse reaction to receiving such a data frame.

All of these instances of superfluous data frames consume processing resources and increase congestion in the networking system. However, in many situations, all of the adverse effects from all of these superfluous data frames are acceptable. For example, an ordinary user of a wireless network at home or in a typical office setting is not likely to notice any adverse effects from all such superfluous data frames. On the other hand, in other situations, where superfluous data frames may interfere with system operation, various additional forms of intelligent filtering and routing may be added to the network software 224 and/or the VNC 230 to further limit or substantially eliminate superfluous data frames, as described above.

Figure 4C:
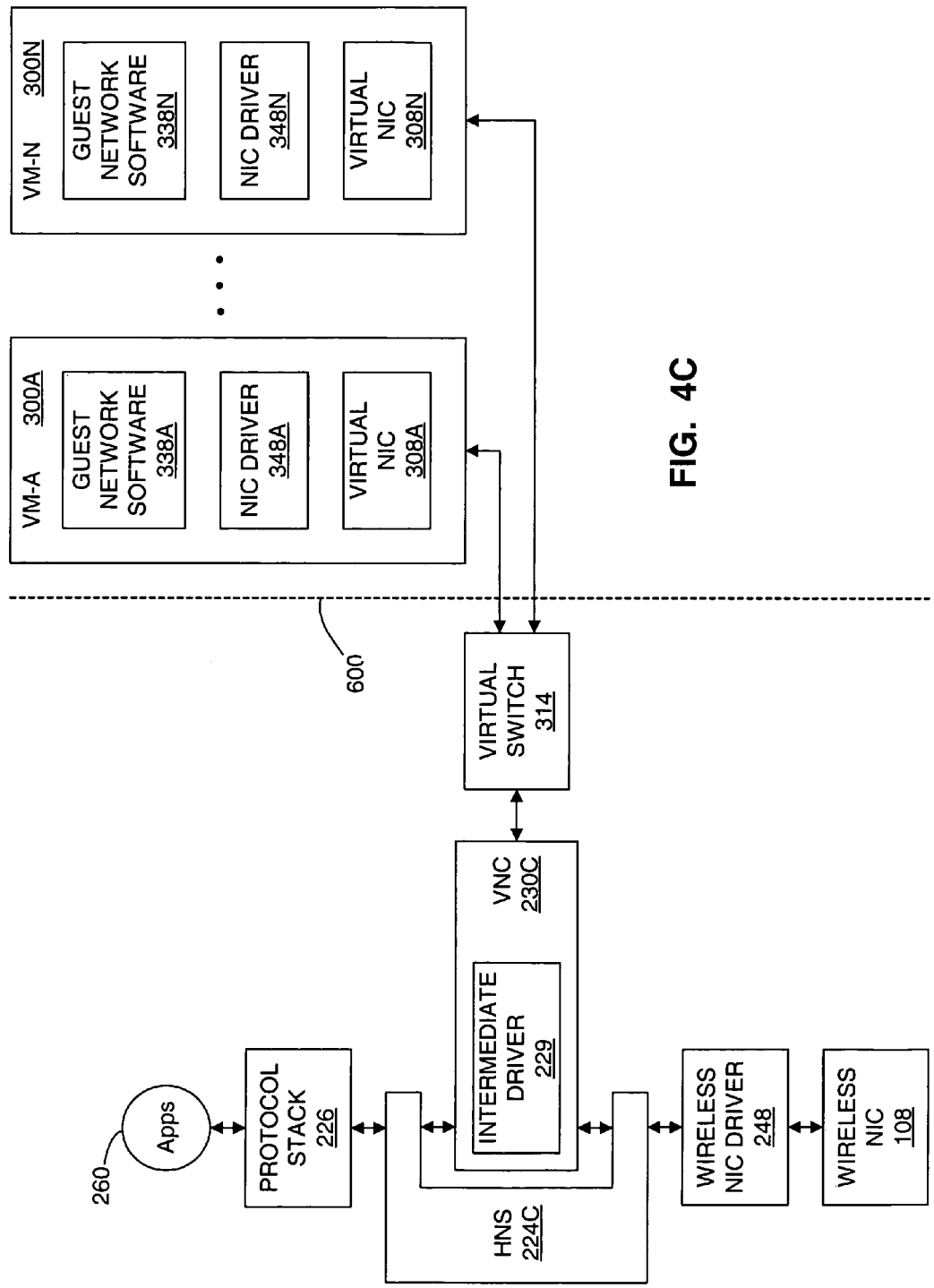
FIG. 4C illustrates a general configuration for networking components within a virtual computer system, which includes a wireless NIC and in which a third embodiment of the invention is implemented.

FIG. 4C illustrates another implementation of the VNC 230 and the HNS 224 that may be advantageously used when the host OS 220 comprises a modern Windows OS. Specifically, FIG. 4C includes the VNC 230C, which is an implementation of the VNC 230, and a HNS 224C, which is an implementation of the HNS 224. Besides the VNC 230C, all of the other elements of FIG. 4C may be substantially the same as the elements described above relative to FIG. 4B. For a modern Windows OS, the HNS 224C may again comprise the NDIS. Also, the protocol stack 226 may again be a standard IP protocol stack that is included in a modern Windows OS, and the wireless NIC driver 248 may again be a conventional NIC driver that is appropriate for both the wireless NIC 108 and the particular Windows OS.

The VNC 230C is substantially similar to the VNCs 230A and 230B. However, the VNC 230C includes an intermediate driver 229 according to the NDIS, instead of either a high-level interface 231 or a low-level interface 232. In accordance with the NDIS, the intermediate driver 229 implements a NIC API at its upper edge and a protocol stack API at its lower edge. The intermediate driver 229 interfaces with the NDIS in a conventional manner at both its upper edge and its lower edge. Thus, for a data frame that is received at the wireless NIC 108 from the access point 2, and that is destined for the host world 290, the data frame is conveyed to the wireless NIC driver 248, then to a low-level interface of the NDIS 224C, then to the intermediate driver 229 of the VNC 230C, then to a high-level interface of the NDIS 224C, and then to the protocol stack 226. Traffic from the host world 290 to a network entity accessible through the wireless NIC 108 follows the opposite path. Thus, all IP traffic arriving at the NDIS 224C from either the protocol stack 226 or the wireless NIC driver 248 is conveyed to the intermediate driver 229.

The intermediate driver 229 receives data frames from the protocol stack 226, which may be destined for the VMs 300A to 300N and/or for a network entity that is accessible through the wireless NIC 108. The intermediate driver 229 also receives data frames from the virtual switch 314, which may be destined for the host world 290 and/or for a network entity that is accessible through the wireless NIC 108. Also, the intermediate driver 229 receives data frames from the wireless NIC driver 248, which may be destined for the host world 290 and/or for the VMs 300A to 300N. In this configuration, the functionality of a hub or a switch may be implemented entirely within the VNC 230C. In comparison to the implementation of FIG. 4B, the VNC 230C may be implemented to function more like a switch, using more intelligent filtering and routing of data frames, to further limit the quantity of superfluous data frames. The VNC 230C can determine the layer 2 and/or layer 3 destination addresses in each data frame it receives from any of the three ports, and route the data frames accordingly.

If the VNC 230C recognizes the destination address(es) of a data frame received from the protocol stack 226 as belonging to one of the VMs 300A to 300N, the VNC may convey the data frame to the virtual switch 314, and not to the wireless NIC driver 248. If the VNC 230C recognizes the destination address(es) as belonging to a network entity accessible through the wireless NIC 108, the VNC may convey the data frame to the wireless NIC driver 248, and not to the virtual switch 314. If the HNS does not recognize the destination address(es), the HNS may convey the data frame to both the virtual switch 314 and the wireless NIC driver 248. If a data frame contains a broadcast or multicast destination address, the data frame may also be forwarded to both the virtual switch 314 and the wireless NIC driver 248.

If a data frame received from the virtual switch 314 contains the MAC address of the wireless NIC 108 in the destination MAC address field, the VNC 230C may forward the data frame to the protocol stack 226, and not to the wireless NIC driver 248. If a data frame contains a unicast address other than the MAC address of the wireless NIC 108, the VNC 230C may forward the data frame to the wireless NIC driver 248, and not to the protocol stack 226. If a data frame contains a broadcast or multicast address, the VNC 230C may forward the data frame to both the protocol stack 226 and the wireless NIC driver 248.

When the VNC 230C receives a data frame from the wireless NIC driver 248, the layer 2 destination address will always be a broadcast address, a multicast address or the unicast address of the wireless NIC 108. If a data frame contains a broadcast address or a multicast address, the VNC 230C may convey the data frame to both the protocol stack 226 and to the virtual switch 314. However, if the data frame contains the MAC address of the wireless NIC 108, the data frame may be destined for either a host application 260 or to one of the VMs 300A to 300N. In this case, the VNC 230C may also refer to the layer 3 destination address to determine the destination for the data frame. If the VNC 230C recognizes the destination IP address as belonging to one of the VMs 300A to 300N, the VNC may convey the data frame to the virtual switch 314, and not to the protocol stack 226. If the VNC 230C recognizes the destination IP address as belonging to the host world 290, the VNC may convey the data frame to the protocol stack 226, and not to the virtual switch 314. If the VNC 230C does not recognize the destination IP address, the VNC may convey the data frame to both the protocol stack 226 and the virtual switch 314.

The VNC 230B combined with the HNS 224B of FIG. 4B can be viewed collectively as implementing a logical network device that uses more intelligent filtering and routing than a simple hub, but not as much as a switch, while the VNC 230C combined with the HNS 224C of FIG. 4C can be viewed collectively as implementing a logical switch. Either of these implementations may be used in a virtual computer system in which the host OS 220 comprises a modern Windows OS with the NDIS. Deciding which of these implementations to use in such a system involves a tradeoff, as each implementation has its advantages. For example, the implementation of FIG. 4C includes more intelligent filtering and routing functionality to limit the quantity of superfluous data frames, which reduces network congestion and limits the strain on processing resources. With the implementation of FIG. 4B, the VNC 230B may have to process, at least to some minimal extent, all data frames conveyed between the protocol stack 226 and the wireless NIC 108, even if no VMs are currently running. On the other hand, the implementation of FIG. 4B may be advantageous for other reasons. For example, the implementation of FIG. 4B may be compatible with more driver configurations than the implementation of FIG. 4C. As is well known, multiple intermediate drivers may not be compatible with one another or they may need to be configured in a particular manner to ensure compatibility. For example, the implementation of FIG. 4C may not be compatible with certain NIC teaming solutions, which are sometimes also implemented as intermediate drivers. Thus, for an implementation that may be used along with one or more other intermediate drivers, the implementation of FIG. 4B may be preferable.

The descriptions above, related to network transfers between guest applications 360 within the VMs 300A to 300N and network entities accessible through the access point 2, focus on "basic" outgoing data frames and "basic" incoming data frames. Network transfers of other outgoing and incoming data frames between the VMs 300A to 300N and network entities accessible through the access point 2 are substantially the same as described above, except that the processing of the data frames within the VNC 230 differs, depending on the type of data frame involved. FIG. 7A illustrates a method performed by the VNC 230 to process different types of outgoing data frames, while FIG. 7B illustrates a method performed by the VNC 230 to process different types of incoming data frames.

The methods of FIGS. 7A and 7B involve special handling for messages related to three different types of network address resolution protocols, namely the basic Address Resolution Protocol (ARP), the Reverse Address Resolution Protocol (RARP) and the Inverse Address Resolution Protocol (IARP). These three protocols are referred to collectively herein as XARP, so that an XARP message is an ARP message, a RARP message or an IARP message. The XARP protocols are defined in Requests for Comments (RFCs) that are managed by the Internet Engineering Task Force (IETF) and the Internet Engineering Steering Group (IESG). These RFCs are currently posted on the World Wide Web at ietf.org/rfc.html. The ARP is defined in RFC 826 and the RARP is defined in RFC 903. The IARP was defined in RFC 1293, but is now defined in RFC 2390, which is currently only a proposed or draft standard, but which has made RFC 1293 obsolete.

The ARP may be used, for example, when a first network entity has a layer 3 address of a second network entity, but needs to know the layer 2 address of the second network entity. The format of all three XARP messages includes a source layer 2 address field, a source layer 3 address field, a target layer 2 address field and a target layer 3 address field. A layer 2 header in a data frame also typically has a "source layer 2 address field" and a layer 3 header in a data frame typically has a "source layer 3 address field." To avoid confusion between the multiple uses of this same terminology, the source layer 2 address field in an XARP message will be referred to herein as a "sender" layer 2 address field, while the source layer 3 address field in an XARP message will be referred to herein as a "sender" layer 3 address field. Thus, the first network entity may generate an ARP query message containing its own layer 2 and layer 3 addresses in the sender layer 2 and layer 3 address fields, and containing the layer 3 address of the second network entity in the target layer 3 address field, with the target layer 2 address field being specified as "undefined" in RFC 826. Placing the word "undefined" in quotation marks below is intended to indicate that the relevant RFC specifies that the field is "undefined." A zero is often used in such fields. The first network entity may then broadcast the ARP query message to all entities on the network, using the network broadcast address in the layer 2 destination address field. If the second network entity receives the ARP query message, it may respond with an ARP reply message. The second network entity may place its own layer 2 and layer 3 addresses in the sender layer 2 and layer 3 address fields, and it may place the layer 2 and layer 3 addresses of the first network entity in the target layer 2 and layer 3 address fields. The second network entity may send the ARP reply message back to the first network entity using the first entity's layer 2 address, or it may use a broadcast address.

The RARP may be used, for example, when a first network entity knows its own layer 2 address, but it does not have or know its own layer 3 address. In this case, the first network entity may generate an RARP query message containing its own layer 2 address in the sender layer 2 address field and in the target layer 2 address field, with the sender layer 3 address field and the target layer 3 address field being "undefined". The first network entity may then broadcast the RARP query message to all entities on the network. If a RARP server receives the RARP query message and has a layer 3 address for the first network entity, it may respond with a RARP reply message. The RARP server may place its own layer 2 and layer 3 addresses in the sender layer 2 and layer 3 address fields, and it may place the layer 2 and layer 3 addresses of the first network entity in the target layer 2 and layer 3 address fields. The RARP server may send the RARP reply message back to the first network entity using the first entity's layer 2 address, or it may use a broadcast address.

The IARP may be used, for example, when a first network entity has a layer 2 address of a second network entity, but needs the layer 3 address of the second network entity. In this case, the first network entity may generate an IARP query message containing its own layer 2 and layer 3 addresses in the sender layer 2 and layer 3 address fields, and containing the layer 2 address of the second network entity in the target layer 2 address field, with the target layer 3 address field being "undefined." The first network entity may then send the IARP query message to the second network entity using the layer 2 address of the second entity. If the second network entity receives the IARP query message, it may respond with an IARP reply message. The second network entity may place its own layer 2 and layer 3 addresses in the sender layer 2 and layer 3 address fields, and it may place the layer 2 and layer 3 addresses of the first network entity in the target layer 2 and layer 3 address fields. The second network entity may send the IARP reply message back to the first network entity using the first entity's layer 2 address.

The method of FIG. 7A is described below both in general terms and also in more specific terms in connection with an example of the VM 300A of the virtual computer system 10 sending an outgoing Ethernet data frame to the network entity 9. The method of FIG. 7A begins at an initial step 800. Next, at a step 802, the VNC 230 determines whether the outgoing data frame contains a layer 3 data packet, such as an IP data packet, such as by checking the type field in an Ethernet header. If the data frame does contain an IP data packet, then the method proceeds to a step 804; otherwise, the method proceeds to a step 810.

At the step 804, the VNC 230 may add or update an entry to the address mapping table 234. First, the VNC 230 may determine whether the source layer 3 address from the data frame is inappropriate for general use, such as in the case of an IP address of 0.0.0.0 or 255.255.255.255. If the source layer 3 address is inappropriate for general use, the VNC 230 may choose not to add or update an entry to the table. Otherwise, the VNC 230 next determines whether the address mapping table 234 includes an entry that contains the layer 2 source address from the data frame and/or whether any entry contains the layer 3 source address from the data frame.

In the preferred embodiment, each VM 300A to 300N has only one layer 2 address for each virtual NIC 308, but may use multiple layer 3 addresses for a given virtual NIC. Also each layer 2 address and each layer 3 address should be unique within the virtual computer system 10. Also, the correlation between layer 2 addresses and layer 3 addresses may change over time. As a result of these conditions, the address mapping table 234 should have only one entry with any given layer 3 address, but may have multiple entries with a given layer 2 address, mapping the layer 2 address to multiple layer 3 addresses.

If an entry in the table contains both the layer 2 address and the layer 3 address from the source address fields of the data frame, the VNC may simply update the timestamp value for that entry. Otherwise, if an entry contains the layer 3 address from the data frame, but a different layer 2 address, then the VNC preferably replaces the layer 2 address in the entry with the layer 2 source address from the data frame. If an entry contains the layer 2 address from the data frame and a layer 3 address that is inappropriate for general use, then the VNC may add the layer 3 from the data frame to the entry in the table. Otherwise, if none of the situations above exists, then the VNC adds a new entry to the table containing the layer 2 and layer 3 source addresses from the data frame. In any of these cases in which an entry in the table is added or updated, a current timestamp is also added to the table entry. In the example, the new or updated entry includes the MAC address 715A of the virtual NIC 308A and the IP address 749A of the VM 300A. Also at the step 804, the VNC replaces the layer 2 source address (SRC MAC) in the data frame with the layer 2 address of the host adapter. In the example, the VNC replaces the MAC address 715A of the virtual NIC 308A in the source address field with the MAC address 109 of the wireless NIC 108, as illustrated in FIG. 5A.

Next, at a step 806, the VNC 230 determines whether the IP data packet is a UDP packet addressed to port 67, or, in other words, whether the IP data packet is a server-bound BOOTP or DHCP message. If so, the method proceeds to a step 808, otherwise, the method proceeds to a step 822. At the step 808, the VNC sets the broadcast bit of the outgoing message, if the bit is not already set. Then, if the broadcast bit is changed in this step, the VNC updates any relevant checksums of the data frame to account for the change in the broadcast bit. The broadcast bit is set in this step to ensure that the VNC receives any reply from a BOOTP or DHCP server in response to the outgoing message. After the step 808, the method proceeds to the step 822. At the step 822, the outgoing data frame is forwarded to the host adapter, or the wireless NIC driver 248 in the example.

BOOTP and DHCP messages include a field within the message body referred to as "chaddr" that indicates the client hardware address. When a VM generates a BOOTP or DHCP request, the VM places the layer 2 address of its own virtual NIC in the chaddr field of the message body and in the source address field of the layer 2 header of the data frame. As the data frame passes through the VNC, the VNC changes the occurrence of the VM's layer 2 address in the data frame header to the layer 2 address of the wireless NIC 108, but leaves the chaddr field of the message body unchanged, so that it retains the VM's layer 2 address. Thus, the source layer 2 address in the data frame header does not match the client layer 2 address within the message body. In some circumstances, this mismatch of layer 2 addresses may cause a problem in the overall process of getting an IP address to a VM using BOOTP or DHCP. For example, a DHCP server may receive a DHCP request from the VM, but the server may not generate a DHCP reply because of the layer 2 address mismatch.

For systems using BOOTP, a special workaround based on the particular implementation may be required to resolve this issue, but for DHCP, more general solutions are still possible. In particular, the processing of data frames performed by the VNC may be extended to resolve the issue. In addition to modifying the source layer 2 address in the data frame, the VNC may also replace the layer 2 address in the chaddr field of the message body with the layer 2 address of the wireless NIC 108. In this case, without any further action, the DHCP request would appear to a DHCP server to be a request from the host world 290, not a request from a VM, and so the DHCP server would return the IP address of the host world instead of the IP address of the VM. To remedy this situation, the VNC may insert the layer 2 address of the VM into the client identifier extension of the DHCP request. According to the DHCP standard, if the client identifier extension is used, a DHCP server must use the value contained in this field to identify the client for which an IP address is desired, instead of using the chaddr field. Thus, the DHCP server will return an IP address for the VM, instead of for the host world 290, despite the fact that both the chaddr field of the message body and the source layer 2 address field of the data frame header contain the layer 2 address of the wireless NIC 108.

In this alternative implementation, the VNC may be configured so as not to set the broadcast bit, in contrast to the step 808 described above. In this case, although some DHCP servers reply with a broadcast message even if the broadcast bit is not set, the DHCP reply will typically contain the layer 2 address of the wireless NIC 108 in the destination layer 2 address field of the data frame header and in the chaddr field of the message body. This makes the DHCP reply appear to be directed to the host 290. However, the VNC may take further action to ensure that the DHCP reply is forwarded to the appropriate VM. If the VNC can be assured that the DHCP reply generated by the DHCP server will contain the layer 2 address of the VM in the client identifier extension, then the VNC can simply copy this value from the client identifier extension field to the chaddr field of the message body of the DHCP reply and to the destination layer 2 address field of the data frame header, so that the DHCP reply is forwarded to the appropriate VM. If however, the DHCP reply is sent to a broadcast address, however, the destination layer 2 address is not changed.

If the VNC cannot be assured that the DHCP server will return the layer 2 address of the VM in the client identifier extension of the DHCP reply, then the VNC may keep track of transaction ID values to ensure that DHCP replies get to the appropriate VMs. For example, the transaction ID column 743 of the address mapping table 234 may be used to store transaction IDs for pending DHCP requests for each of the VMs 300A to 300N. When an outgoing DHCP request passes through the VNC, the VNC may enter the transaction ID contained in the message into the transaction ID field of the entry of the address mapping table that contains the VMs layer 2 address. When an incoming DHCP reply passes through the VNC, the VNC may match the transaction ID in the message with a transaction ID in the address mapping table. The VNC may then insert the layer 2 address obtained from the entry in the address mapping table into the chaddr field of the message body of the DHCP reply and in the destination layer 2 address field of the data frame header, to ensure that the DHCP reply gets to the VM that sent out the corresponding DHCP request. Again, however, the destination layer 2 address is only changed if the DHCP reply is unicast.

Each of these techniques for attempting to get DHCP replies to the appropriate VMs, namely setting the broadcast bit of the outgoing DHCP request, relying on client identifier values and tracking transaction ID values may be used individually or in various combinations, depending on the particular implementation. Other, more specialized techniques, based on specific system implementations, may also be used in addition to or instead of these three techniques.

At the step 810, the VNC 230 determines whether the outgoing data frame contains an XARP packet. If the VNC determines that the data frame contains a XARP packet, then the method of FIG. 7A proceeds to a step 812; otherwise, the method proceeds to a step 818. For XARP data frames, in addition to replacing the layer 2 address of the VM in the header with the layer 2 address of the host adapter, the VNC generally also replaces the layer 2 sender or target addresses within the XARP query and reply messages. The object of processing both outgoing and incoming XARP messages is to enable network entities, and possibly host applications 260, to use XARP messages with the VMs 300A to 300N, but using the layer 2 address of the host adapter in both the header and the XARP message, instead of the layer 2 address of the virtual NIC of the corresponding VM 300A to 300N. In particular, the primary object is to enable network entities, and possibly host applications, to send ARP requests to determine a layer 2 address that corresponds with the layer 3 address of a VM 300A to 300N, and to ensure that the ARP reply indicates the layer 2 address of the wireless NIC 108, instead of the layer 2 address of the virtual NIC 308 of the particular VM, so that a network entity sending such an ARP request will subsequently send network traffic to the VM using the layer 2 address of the wireless NIC 108 and not the layer 2 address of the VM's virtual NIC 308. The particular addresses used, in one embodiment of the invention, in both the data frame header and the message body for the various types of XARP queries and replies are described below in connection with FIG. 8.

At the step 812, the VNC 230 determines whether the message is a RARP query. For an outgoing RARP query, the address mapping table 234 is not updated, because the data frame contains no layer 3 address for the source VM that can be mapped to the VM's layer 2 address. Also, in the preferred embodiment, the target layer 2 address field within the message contains the layer 2 address of the sending VM, so that a RARP server receiving the query may determine the layer 2 address for which a layer 3 address is desired. If, at the step 812, the VNC determines that the message is a RARP query, the method proceeds to a step 816; otherwise, the method proceeds to a step 814. At the step 814, an entry in the address mapping table 234 may be updated or a new entry may be added, as described above in connection with the step 804. After the step 814, the method proceeds to the step 816. At the step 816, the layer 2 source address in the layer 2 header (SRC MAC) is replaced by the layer 2 address of the host adapter. In the example, the MAC address 715A of the virtual NIC 308A is replaced in the MAC address field of the Ethernet header with the MAC address 109 of the wireless NIC 108. Also at the step 816, the sender layer 2 address field (SEND MAC) within the XARP message is changed from the layer 2 address of the source VM to the layer 2 address of the host. In the example, the MAC address 715A of the virtual NIC 308A is replaced in the sender MAC address field of the XARP message with the MAC address 109 of the wireless NIC 108. Also, the VNC 230 may add an entry to the address mapping table 234 containing the layer 2 source address from the data frame and a layer 3 address that is inappropriate for general use, along with a current time stamp. After the step 816, the method proceeds to the step 822 and the modified data frame is forwarded.

At the step 818, the VNC 230 determines whether the layer 2 destination address of the outgoing data frame contains a unicast address, a broadcast address or a multicast address. If the data frame contains a broadcast address or a multicast address, the method proceeds to a step 820. If the frame contains a unicast address, the method proceeds to a step 824. At the step 824, the VNC may drop the outgoing data frame, instead of forwarding the data frame to the host adapter, or anywhere else. Alternatively, the outgoing data frame may simply be forwarded to the host adapter or elsewhere for further processing. At the step 820, the VNC replaces the layer 2 source address in the layer 2 header with the layer 2 address of the host adapter. In the example, the MAC address 715A of the virtual NIC 308A is replaced in the MAC address field of the Ethernet header with the MAC address 109 of the wireless NIC 108. After the step 820, the method proceeds to the step 822 and the modified data frame is forwarded. After the step 822 or after the step 824, the method of FIG. 7A terminates at a step 826.

The method of FIG. 7B is also described in general terms as well as in more specific terms in connection with an example of the network entity 9 sending an incoming Ethernet data frame to the VM 300A of the virtual system 10. The method of FIG. 7B begins at an initial step 850. Next, at a step 852, the VNC 230 determines whether the incoming data frame contains a layer 3 data packet, such as an IP data packet. If the data frame does contain an IP data packet, then the method proceeds to a step 854; otherwise, the method proceeds to a step 860.

At the step 854, the VNC 230 determines whether the layer 2 destination address field in the incoming data frame contains a unicast address or a broadcast or multicast address. If the data frame contains a unicast address, the method proceeds to a step 856. If the data frame contains a broadcast address or a multicast address, then the method proceeds to a step 878. If there is a broadcast address or multicast address, there is no need to switch the address to a VM's layer 2 address. The virtual network 312 and the VMs 300A to 300N can process the data frame in a conventional manner, based on the broadcast or multicast address.

At the step 856, the VNC 230 determines whether the address mapping table 234 contains an entry that includes the layer 3 address from the destination address field of the data frame. In the example, the VNC finds the IP address of the VM 300A in the destination IP address field of the Ethernet header, and determines whether the address mapping table includes an entry that contains this IP address. If such an entry does exist, then the data frame is a "basic" incoming data frame as described above, and the method proceeds to a step 858; otherwise, the method proceeds to a step 880. At the step 880, the VNC may drop the incoming data frame, and not forward the data frame to the virtual switch 314, or anywhere else. Alternatively, the incoming data frame may be forwarded to the virtual switch 314 or elsewhere for additional processing. At the step 858, the VNC obtains the layer 2 address contained in the entry discovered at the step 856, and replaces the layer 2 destination address (DEST MAC) in the data frame with the layer 2 address from the entry. In the example, the VNC replaces the MAC address 109 of the wireless NIC 108 in the destination address field of the Ethernet header with the MAC address 715A of the virtual NIC 308A. After the step 858, the method proceeds to the step 878. At the step 878, the incoming data frame is forwarded toward the VM destination, or to the virtual switch 314 in the example.

At the step 860, the VNC 230 determines whether the incoming data frame contains an XARP query. If so, then the method of FIG. 7B proceeds to a step 862; otherwise, the method proceeds to a step 866. At the step 862, the VNC determines (a) whether the message is an ARP query and (b) whether the address mapping table 234 includes an entry that contains the sender layer 3 address from the message body. If both of these conditions are satisfied, then the method proceeds to a step 864; otherwise, the method proceeds to a step 865. At the step 864, the VNC obtains the layer 2 sender address contained in the ARP query. If this layer 2 address is the layer 2 address of the host adapter, then the method proceeds to the step 880 and the incoming data frame is dropped; otherwise, the method proceeds to the 865.

The steps 862 and 864 are implemented to handle a special case where a VM sends out an ARP query containing its own layer 3 address in the target layer 3 address field to determine if any other network entity is using the same layer 3 address as the requesting VM. If another network entity does have the same layer 3 address and receives the ARP query, the other network entity may respond with an ARP reply specifying its own layer 2 address as the layer 2 address that corresponds with the layer 3 address specified by the requesting VM. If the requesting VM receives any such ARP reply, then the requesting VM can determine that both the requesting VM and the other network entity are using the same layer 3 address.

However, the ARP query from the requesting VM passes through the VNC 230 as an outgoing data frame, and the data frame is processed according to the method of FIG. 7A. At the steps 814 and 816, the VNC 230 replaces both the layer 2 source address in the layer 2 header and the layer 2 sender address specified in the ARP query packet with the layer 2 address of the host adapter. Depending on the configuration of the host network software 222, the wireless NIC driver 248, the wireless NIC 108 and the network to which the wireless NIC is connected, the modified ARP query data frame from the VNC 230 may be looped back to the VNC 230. If such an event occurs, the looped back data frame is treated as an incoming data frame by the VNC 230, and the data frame is processed according to the method of FIG. 7B. If the data frame were forwarded on to the virtual switch 314 by the VNC without any modification, then the requesting VM would see its own ARP query, containing its own layer 3 address in the layer 3 sender and target address fields, but with the layer 2 address of the host adapter in the layer 2 source address field of the header of the data frame and in the layer 2 sender address field of the query. Thus, it would appear to the requesting VM that the ARP query was generated by the host, but that the host is using the same layer 3 address as the requesting VM, and the requesting VM might report an error condition that does not really exist. To avoid this possible misreporting of an error condition, the VNC drops any ARP query for which the layer 3 target address is found in the address mapping table at the step 862, meaning that the layer 3 address belongs to a VM, and the layer 2 sender address in the query or the layer 2 source address in the header matches the layer 2 address of the host adapter.

The step 865 is implemented to check for and handle a possible unicast address in the layer 2 destination address of the incoming XARP query. The incoming XARP query may well be intended for one of the VMs 300A to 300N. However, if it was addressed using a unicast layer 2 address, then it will not contain the layer 2 address of the appropriate VM, and so it would not otherwise be received by the VM. The step 865 ensures that the incoming XARP query is received by the intended VM, as appropriate.

Figure 7C:
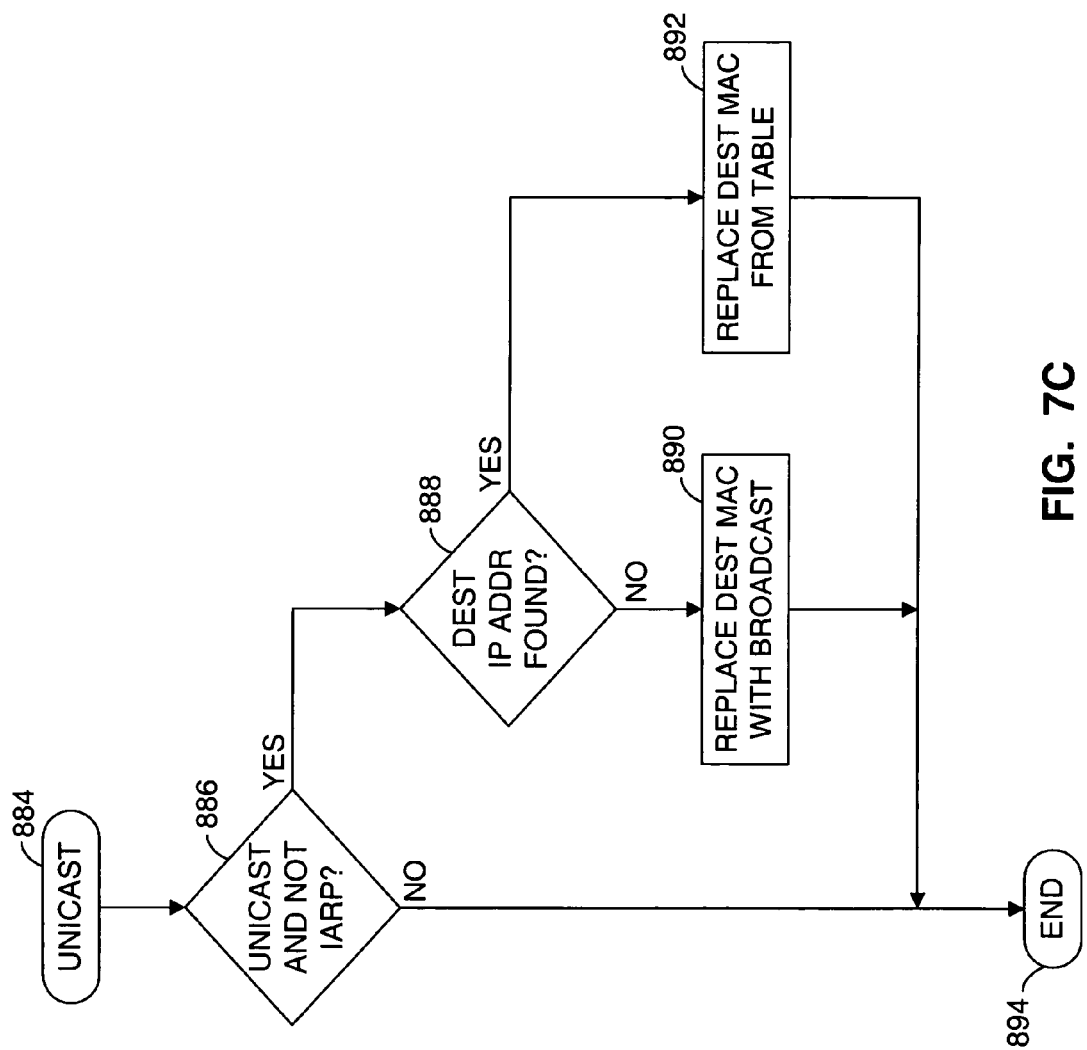
FIG. 7C illustrates a method for handling unicast address resolution protocol queries within the method of FIG. 7B.

The step 865 implements a method that is illustrated in FIG. 7C. The method begins at an initial step 884. Next, at a step 886, the VNC determines whether the incoming XARP query contains a unicast address in the layer 2 destination address field of the data frame. The VNC also determines whether the XARP query is an IARP query. If a unicast address is found, and the query is not an IARP query, then the method proceeds to a step 888; otherwise, the method proceeds directly to a step 894.

At the step 888, the VNC 230 determines whether the address mapping table 234 includes an entry that contains the layer 3 target address from the query. If such an entry does exist, then the method proceeds to a step 892; otherwise, the method proceeds to a step 890. At the step 890, the VNC replaces the layer 2 destination address (DEST MAC) with the layer 2 broadcast address. At the step 892, the VNC replaces the layer 2 destination address (DEST MAC) with the layer 2 address contained in the entry discovered during the step 888. In the example, the destination MAC address contained in the XARP query is the MAC address 109 of the wireless NIC 108, which is replaced by the MAC address 715A of the virtual NIC 308A. After either of the steps 890 or 892, the method of FIG. 7C proceeds to the step 894, and the method terminates. After the method of the step 865 completes, the method of FIG. 7B proceeds to the step 878, and the incoming data frame is forwarded.

At the step 866, the VNC 230 determines whether the incoming data frame contains an XARP reply. If so, then the method of FIG. 7B proceeds to a step 868; otherwise, the method proceeds to a step 877. At the step 868, the VNC determines whether the layer 2 destination address field in the incoming data frame contains a unicast address or a broadcast or multicast address. If the data frame contains a broadcast address or a multicast address, the method proceeds to a step 870. If the data frame contains a unicast address, then the method proceeds to a step 874.

At the step 870, the VNC 230 determines whether the address mapping table 234 includes an entry that contains the layer 3 target address from the reply. If such an entry does exist, then the method proceeds to a step 872; otherwise, the method proceeds to the step 878, and the incoming data frame is forwarded without any modification. At the step 872, the VNC replaces the layer 2 target address in the XARP reply (TARG MAC) with the layer 2 address contained in the entry discovered during the step 870. In the example, the target MAC address contained in the XARP reply is the MAC address 109 of the wireless NIC 108, which is replaced by the MAC address 715A of the virtual NIC 308A. After the step 872, the method proceeds to the step 878, and the modified data frame is forwarded.

At the step 874, the VNC 230 determines whether the address mapping table 234 contains an entry that includes the layer 3 target address from the reply. If such an entry does exist, then the method proceeds to a step 876; otherwise, the method proceeds to the step 880, and the incoming data frame is dropped. At the step 876, the VNC replaces both the layer 2 destination address from the layer 2 header and the layer 2 target address in the XARP reply with the layer 2 address contained in the entry discovered during the step 874. In the example, the destination MAC address field in the Ethernet header and the target MAC address field in the XARP reply each contains the MAC address 109 of the wireless NIC 108, which is replaced by the MAC address 715A of the virtual NIC 308A in both locations. After the step 876, the method proceeds to the step 878, and the modified data frame is forwarded. In some situations, however, the step 874 may not handle a unicast RARP reply correctly because the address mapping table may not contain an entry that includes the layer 3 target address from the reply. The VNC may avoid this potential mishandling by detecting any RARP replies, and replacing their layer 2 destination addresses with the layer 2 broadcast address and proceeding to the step 878.

At the step 877, the VNC 230 determines whether the layer 2 destination address field in the incoming data frame contains a unicast address or a broadcast or multicast address. If the data frame contains a broadcast address or a multicast address, the method proceeds to the step 878, and the data frame is forwarded unmodified. If the data frame contains a unicast address, then the method proceeds to the step 880, and the incoming data frame is dropped. After the step 878 or after the step 880, the method of FIG. 7B terminates at a step 882.

FIG. 8 shows the contents of the address fields for both the header and the message body for incoming and outgoing data frames containing XARP query and reply messages, for one embodiment of the invention. The embodiment of FIG. 8 involves a virtual computer system, such as the system 10, connected to a computer network, such as the network illustrated in FIG. 3. The embodiment includes a VM, a VNC, a host and a network entity, such as the VM 300A, the VNC 230, the host 290 and the network entity 9, which may all be arranged and configured as described above. The VM 300A, the VNC 230, the host 290 and the network entity 9 are used in the example below for simplicity. Also, the example of FIG. 8 uses Ethernet and IP terminology for simplicity, although the same approach may be applied to other networking technologies. The description below refers to the MAC address 715A of the VM 300A, the IP address 749A of the VM 300A, the MAC address 109 of the host 290, as well as both the MAC address and the IP address of the network entity 9. Also, when the description below refers to the Ethernet broadcast address, the related description also generally applies to the use of an Ethernet multicast address.

FIG. 8 provides six different address values for twelve different types of XARP message. The address values provided are shown in the first row of the table of FIG. 8. They include the source MAC address (SRC MAC) and the destination MAC address (DEST MAC) in the header of the data frame, along with the sender MAC address (SEND MAC), the sender IP address (SEND IP), the target MAC address (TARG MAC) and the target IP address (TARG IP) within the XARP message body. The types of XARP message are: an outgoing ARP query and a corresponding incoming ARP reply, an outgoing RARP query and a corresponding incoming RARP reply, an outgoing IARP query and a corresponding incoming IARP reply, an incoming ARP query and a corresponding outgoing ARP reply, an incoming RARP query and a corresponding outgoing RARP reply, and an incoming IARP query and a corresponding outgoing IARP reply.

Referring to the second row of the table of FIG. 8, for an outgoing ARP query from the VM 300A seeking a MAC address corresponding to the IP address of the network entity 9, the VM 300A uses its own MAC address for the source MAC address, either the Ethernet broadcast address or the MAC address of the network entity 9 for the destination MAC address, its own MAC address for the sender MAC address, its own IP address for the sender IP address, a zero or "undefined" value for the target MAC address and the IP address of the network entity 9 for the target IP address. When the message passes through the VNC 230, the VNC replaces the MAC address of the VM 300A with the MAC address of the host 290 in both the source MAC address field and the sender MAC address field, as indicated by the arrows in the respective fields of FIG. 8. Thus, the entry "VM→HOST" means that the VM 300A places its own MAC address in the respective address field, but that when the message passes through the VNC 230, the VNC replaces the MAC address of the VM 300A with the MAC address of the host 290. Similarly, the entry "HOST→VM" means that the network entity 9 places the MAC address of the host 290 in the respective address field, but that when the message passes through the VNC 230, the VNC replaces the MAC address of the host 290 with the MAC address of the VM 300A.

If the network entity 9 receives the outgoing ARP query, it may generate a responsive ARP reply, which would be an incoming ARP reply at the VNC 230. The third row of the table of FIG. 8 shows the addresses used for such an ARP reply. In such an ARP reply, the network entity 9 uses its own MAC address for the source MAC address, either the Ethernet broadcast address or the MAC address of the host 290 for the destination MAC address, its own MAC address for the sender MAC address, its own IP address for the sender IP address, the MAC address of the host 290 for the target MAC address and the IP address of the VM 300A for the target IP address. When the message passes through the VNC 230, the VNC replaces the MAC address of the host 290 with the MAC address of the VM 300A in the target MAC address field, and also in the destination MAC address field, if the destination MAC address field contains the MAC address of the host 290, instead of the broadcast address.

For the fourth and fifth rows of FIG. 8, suppose that the network entity 9 is a RARP server. As shown in the fourth row, for an outgoing RARP query from the VM 300A seeking an IP address for itself, the VM 300A uses its own MAC address for the source MAC address, either the Ethernet broadcast address or the MAC address of the network entity 9 for the destination MAC address, its own MAC address for the sender MAC address, and a zero or "undefined" value for the sender IP address, its own MAC address for the target MAC address and a zero or "undefined" value for the target IP address. When the message passes through the VNC 230, the VNC replaces the MAC address of the VM 300A with the MAC address of the host 290 in the source MAC address field and in the sender MAC address field.

If the network entity 9 receives the outgoing RARP query, it may generate a responsive RARP reply, which would be an incoming RARP reply at the VNC 230. The fifth row of FIG. 8 shows that for such a RARP reply, the network entity 9 uses its own MAC address for the source MAC address, either the Ethernet broadcast address or the MAC address of the host 290 for the destination MAC address, its own MAC address for the sender MAC address, its own IP address for the sender IP address, the MAC address of the VM300A for the target MAC address and the IP address of the VM 300A for the target IP address. When the message passes through the VNC 230, the VNC replaces the MAC address of the host 290 with the MAC address of the VM 300A in the destination MAC address field, if the destination MAC address field contains the MAC address of the host 290, instead of the broadcast address.

As shown in the sixth row of FIG. 8, for an outgoing IARP query from the VM 300A seeking an IP address corresponding to the MAC address of the network entity 9, the VM 300A uses its own MAC address for the source MAC address, the MAC address for the network entity 9 for the destination MAC address, its own MAC address for the sender MAC address, its own IP address for the sender IP address, the MAC address of the network entity 9 for the target MAC address and a zero or "undefined" value for the target IP address. When the message passes through the VNC 230, the VNC replaces the MAC address of the VM 300A with the MAC address of the host 290 in both the source MAC address field and the sender MAC address field.

If the network entity 9 receives the outgoing IARP query, it may generate a responsive IARP reply, which would be an incoming IARP reply at the VNC 230. The seventh row of FIG. 8 shows that for such an IARP reply, the network entity 9 uses its own MAC address for the source MAC address, either the Ethernet broadcast address or the MAC address of the host 290 for the destination MAC address, its own MAC address for the sender MAC address, its own IP address for the sender IP address, the MAC address of the host 290 for the target MAC address and the IP address of the VM 300A for the target IP address. When the message passes through the VNC 230, the VNC replaces the MAC address of the host 290 with the MAC address of the VM 300A in the target MAC address field, and also in the destination MAC address field, if the destination MAC address field contains the MAC address of the host 290, instead of the broadcast address.

Now consider the possibility of the network entity 9 generating the different types of XARP queries, as well as the possibility of the VM 300A receiving the queries and generating responsive XARP replies. Referring to the eighth row of the table of FIG. 8, for an incoming ARP query from the network entity 9 seeking a MAC address corresponding to the IP address of the VM 300A, the network entity 9 uses its own MAC address for the source MAC address, the Ethernet broadcast address or the MAC address of the host 290 for the destination MAC address, its own MAC address for the sender MAC address, its own IP address for the sender IP address, a zero or an "undefined" value for the target MAC address and the IP address of the VM 300A for the target IP address. When the message passes through the VNC 230, the VNC replaces the MAC address of the host 290 with the MAC address of the VM 300A in the destination MAC address field, if the destination MAC address field contains the MAC address of the host 290, instead of the broadcast address. Alternatively, the VNC could replace the MAC address of the host 290 in the destination MAC address field with the broadcast address.

If the VM 300A receives the incoming ARP query, it may generate a responsive ARP reply, which would be an outgoing ARP reply at the VNC 230. The ninth row of FIG. 8 shows that for such an ARP reply, the VM 300A uses its own MAC address for the source MAC address, either the Ethernet broadcast address or the MAC address of the network entity 9 for the destination MAC address, its own MAC address for the sender MAC address, its own IP address for the sender IP address, the MAC address of the network entity 9 for the target MAC address and the IP address of the network entity 9 for the target IP address. When the message passes through the VNC 230, the VNC replaces the MAC address of the VM 300A with the MAC address of the host 290 in the source MAC address field and the sender MAC address field.

For the tenth and eleventh rows of FIG. 8, suppose that the VM 300A is a RARP server. Referring to the tenth row of FIG. 8, for an incoming RARP query from the network entity 9 seeking an IP address for itself, the network entity 9 uses its own MAC address for the source MAC address, the Ethernet broadcast address or the MAC address of the host 290 for the destination MAC address, its own MAC address for the sender MAC address, and an "undefined" value for the sender IP address, its own MAC address for the target MAC address and a zero or an "undefined" value for the target IP address. When the message passes through the VNC 230, the VNC replaces the MAC address of the host 290 with the MAC address of the VM 300A in the destination MAC address field, if the destination MAC address field contains the MAC address of the host 290, instead of the broadcast address. Alternatively, the VNC could replace the MAC address of the host 290 in the destination MAC address field with the broadcast address.

If the VM 300A receives the incoming RARP query, it may generate a responsive RARP reply, which would be an outgoing RARP reply at the VNC 230. The eleventh row of FIG. 8 shows that for such a RARP reply, the VM 300A uses its own MAC address for the source MAC address, either the Ethernet broadcast address or the MAC address of the network entity 9 for the destination MAC address, its own MAC address for the sender MAC address, its own IP address for the sender IP address, the MAC address of the network entity 9 for the target MAC address and the IP address of the network entity 9 for the target IP address. When the message passes through the VNC 230, the VNC replaces the MAC address of the VM 300A with the MAC address of the host 290 in the source MAC address field and the sender MAC address field.

The twelfth row of the table of FIG. 8 is for an incoming IARP query from the network entity 9 seeking an IP address corresponding to the MAC address of the VM 300A. In the preferred embodiment, there is no legitimate reason for a network entity to send an IARP query to a VM. The possibility is covered nonetheless for the sake of completeness. So, for an incoming IARP query from the network entity 9, the network entity 9 uses its own MAC address for the source MAC address, the MAC address of the host 290 for the destination MAC address, its own MAC address for the sender MAC address, its own IP address for the sender IP address and an "undefined" value for the target IP address. Now it would normally be possible for the network entity 9 to use either the MAC address of the host 290 or the MAC address of the VM 300A for the target MAC address. If the network entity 9 uses the MAC address of the VM 300A for the target MAC address, then, when the message passes through the VNC 230, the VNC replaces the MAC address of the host 290 with the MAC address of the VM 300A in the destination MAC address field. However, in the preferred embodiment, if the network entity 9 uses the MAC address of the host 290 for the target MAC address, the VNC can not distinguish such a query from an IARP query sent to the host 290. In such a case, in the preferred embodiment, the VNC makes no changes to the incoming IARP query, assuming it to be directed to the host 290.

If the VM 300A receives the incoming IARP query, it may generate a responsive IARP reply, which would be an outgoing IARP reply at the VNC 230. The thirteenth row of FIG. 8 shows that for such an IARP reply, the VM 300A uses its own MAC address for the source MAC address, either the Ethernet broadcast address or the MAC address of the network entity 9 for the destination MAC address, its own MAC address for the sender MAC address, its own IP address for the sender IP address, the MAC address of the network entity 9 for the target MAC address and the IP address of the network entity 9 for the target IP address. When the message passes through the VNC 230, the VNC replaces the MAC address of the VM 300A with the MAC address of the host 290 in the source MAC address field and the sender MAC address field.

Figure 9:
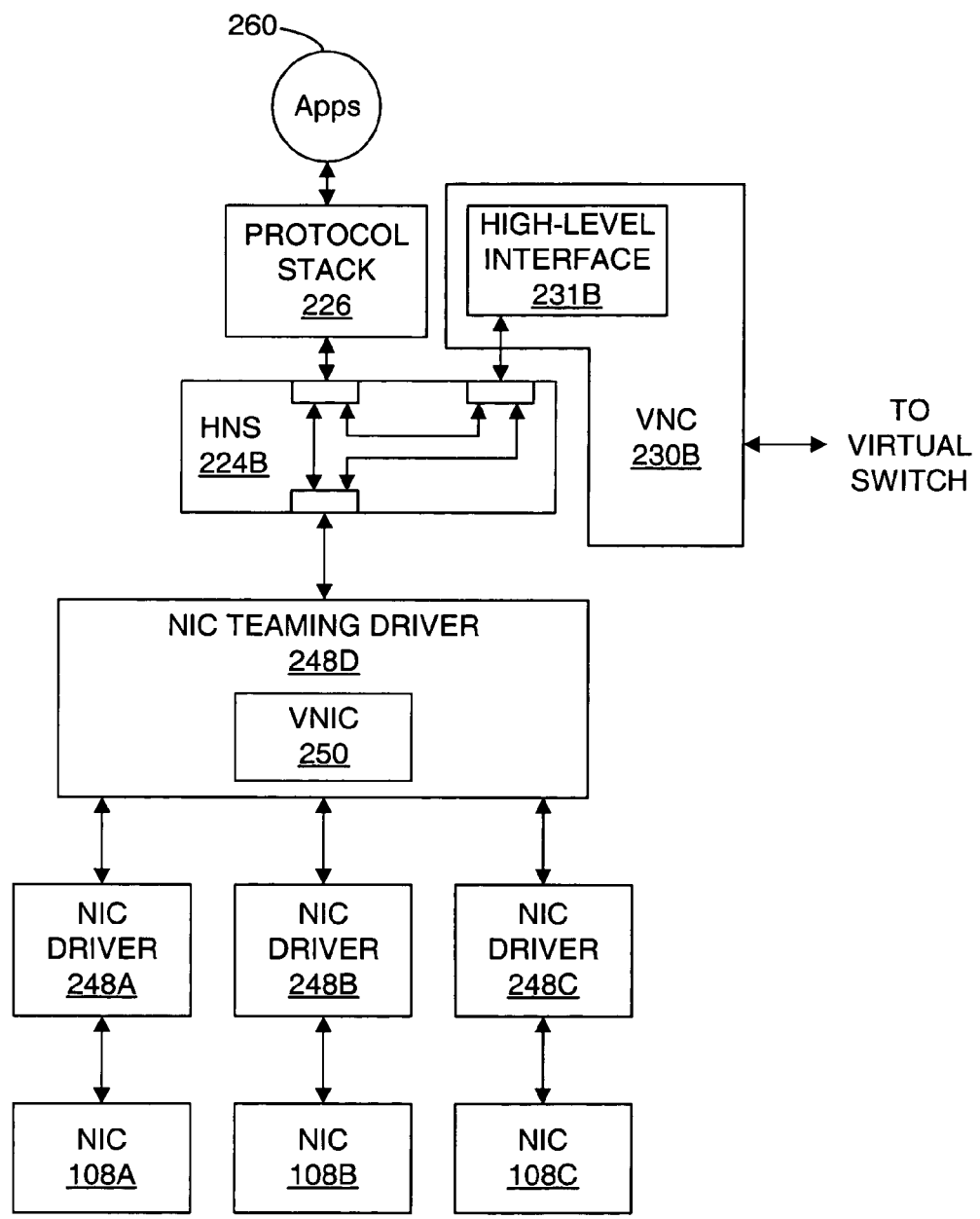
FIG. 9 illustrates a general configuration for networking components within a virtual computer system, which includes multiple NICs and a NIC teaming solution, and in which a fourth embodiment of the invention is implemented.

FIG. 9 illustrates a second configuration for a virtual computer system in which a fourth embodiment of this invention may be implemented. The virtual computer system for this second configuration may be substantially the same as the virtual computer system 10 described above in connection with FIGS. 1, 2, 3, 4A, 4B, 4C, 5A, 5B, 6, 7A, 7B and 8, except as described below. The configuration of FIG. 9 includes the VNC 230B and the HNS 224B of FIG. 4B, but other configurations for the VNC 230 and the HNS 224 are also possible. Otherwise, the only changes required for this second configuration involve replacing the wireless NIC driver 248 and the wireless NIC 108 with the NIC drivers, NIC teaming software and NICs illustrated in FIG. 9.

The wireless NIC 108 is replaced by a plurality of NICs, which may be wired, such as the Intel PRO/1000 MT Server Adapter, or wireless, such as the Linksys WUSB11 Wireless USB Adapter, or a combination of wireless and wired NICs. In the example of FIG. 9, the plurality of NICs comprise the NICs 108A, 108B and 108C. There is a NIC driver for each of the plurality of NICs, which is appropriate for the type of NIC and the host OS 220. If two or more of the NICs are of the same type, capable of being used with the same NIC driver, then the respective NIC drivers may be multiple instances of the same NIC driver. In the example of FIG. 9, the plurality of NIC drivers comprise the NIC drivers 248A, 248B and 248C.

The system of FIG. 9 further comprises a NIC teaming driver 248D, which may be any NIC teaming driver, such as, for example, an Advanced Network Services (ANS) driver from Intel. The NIC teaming driver 248D may be configured in a conventional manner to control the NIC drivers 248A, 248B and 248C and the NICs 108A, 108B and 108C in a conventional NIC teaming arrangement. The HNS 224, the protocol stack 226 and the applications 260 of the host 290 may be configured in a conventional manner to interface with the NIC teaming driver 248D in a conventional manner to utilize the NIC teaming arrangement to access a network to which the NICs 108A, 108B and 108C are connected. The NIC teaming arrangement may provide failover, failback and load balancing functions to provide a higher bandwidth and more reliable network connection than would be obtained by a single, comparable NIC.

Standard NIC teaming drivers, such as the ANS driver from Intel, export a virtual NIC for use by the host network software 222. For example, as shown in FIG. 9, the NIC teaming driver 248D exports a virtual NIC 250. The NIC teaming driver 248D enables the HNS 224 to interface with the virtual NIC 250 for both incoming and outgoing traffic in substantially the same manner as the HNS 224 would interface with a single, conventional NIC through an appropriate NIC driver. In particular, the NIC teaming driver 248D typically exports a single layer 2 address to the HNS 224, the protocol stack 226 and the host applications 260 for traffic flowing through any of the NICs 108A, 108B and 108C, although the NIC drivers 248A, 248B and 248C may nonetheless use different layer 2 addresses. For example, the NIC teaming driver 248D may select the layer 2 address from one of the NICs 108A, 108B or 108C to be used by the virtual NIC 250, which may or may not be used by the NICs 108A, 108B and 108C. The host applications 260, using the protocol stack 226, may access the network using the layer 2 address of the virtual NIC 250 in a conventional manner.

In the virtual computer system of FIG. 9, one or more VMs 300A to 300N may also use the network connection provided by the NIC teaming arrangement. Each of these VMs 300A to 300N again preferably uses its own layer 2 address. Thus, a VM, such as the VM 300A, may attempt to send a data frame to a network entity that is accessible through the virtual NIC 250 using its own layer 2 address in the source layer 2 address of the outgoing data frame header. However, when the outoing data frame passes through the NIC teaming driver 248D, the NIC teaming driver may replace the VM's layer 2 address with the layer 2 address of the virtual NIC 250, depending on the NIC teaming driver and the mode in which the driver is operating. Intel's ANS driver makes such a replacement, for example, when it is in the Adaptive Load Balancing mode with Receive Load Balancing enabled. In this event, any reply to the outgoing data frame may be addressed using the layer 2 address of the virtual NIC 250, instead of the layer 2 address of the VM 300A. As a result, the VM 300A ordinarily would not receive the reply data frames. This situation is substantially the same situation as described above relative to the wireless NIC 108, namely, the host computer and one or more VMs want to use their own layer 2 address to access the network, but only one layer 2 address may be used. In this situation, also, the layer 2 address selected by the NIC teaming driver 248D may be assigned for use by the host 290. The VNC 230, the switch 314, the network software on the host 290 and the network software on the VMs 300A to 300N operate as described above to enable the host 290 and the VMs 300A to 300N to share the same layer 2 address for network access. Network traffic may be routed between the host 290 and the VMs 300A to 300N, between the host 290 and network entities accessible through the NIC teaming arrangement, and between the VMs 300A to 300N and network entities accessible through the NIC teaming arrangement. For traffic between the VMs 300A to 300N and the network entities accessible through the NIC teaming arrangement, as described above, the VNC generally replaces the layer 2 address of the VMs 300A to 300N with the layer 2 address of the host 290 for outgoing traffic, and it generally replaces the layer 2 address of the host 290 with the layer 2 address of the respective VM for incoming traffic. The detailed operation of the VNC 230, as well as the other network components, is substantially the same as described above for the embodiments involving the wireless NIC 108.

In some embodiments, the VNC may be able to detect whether a NIC teaming solution is implemented and possibly also whether the NIC teaming driver 248D is in a mode such that the driver will make the layer 2 address replacements described above. In such embodiments, the VNC may refrain from making its own layer 2 address replacements unless it determines either that a NIC teaming solution is implemented or preferably that a NIC teaming solution is implemented and the NIC teaming driver is in a mode such that the driver will make the layer 2 address replacements described above.

This application describes two example virtual computer system configurations in which the invention may be advantageously implemented, and four example embodiments of the invention implemented in these two configurations. However, the invention may also be advantageously implemented in a wide variety of other configurations in which a network interface is shared by multiple VMs or by a host computer system and one or more VMs, and in a wide variety of different virtual computer systems. A person of skill in the art will be able to identify other configurations and other virtual computer systems in which the invention may be advantageously implemented.

What is claimed is:

1. A method for sharing a network connection between a host software system and a virtual machine, the network connection connecting a single physical computer system to a computer network, the host software system and the virtual machine both executing within the single physical computer system, with a first layer 2 address being associated with the network connection, the method comprising:
    allowing the host software system to use the network connection using the first layer 2 address and a first layer 3 address;
    allowing the virtual machine to attempt to use the network connection using a second layer 2 address and a second layer 3 address, the second layer 2 address being different from the first layer 2 address and the second layer 3 address being different from the first layer 3 address;
    for an outgoing data frame from the virtual machine to the computer network, replacing an occurrence of the second layer 2 address within the outgoing data frame with the first layer 2 address, so that the data frame appears to have originated from a network entity using the first layer 2 address and the second layer 3 address; and
    for an incoming data frame from the computer network, if the data frame is addressed using the first layer 2 address and the second layer 3 address, replacing the first layer 2 address with the second layer 2 address and conveying the data frame toward the virtual machine, so that, after modification, the incoming data frame appears to have been addressed to the virtual machine, using the second layer 2 address and the second layer 3 address.

2. The method of claim 1, wherein the computer system further includes one or more additional virtual machines that are also allowed to share the network connection, with each virtual machine having a layer 2 address that is unique among layer 2 addresses within the physical computer system and a layer 3 address that is unique among layer 3 addresses within the physical computer system, and wherein the method further comprises maintaining a table for correlating layer 2 addresses with layer 3 addresses for the multiple virtual machines.

3. The method of claim 2, wherein, if a virtual machine sends an outgoing data frame using a third layer 2 address and a third layer 3 address as source addresses, and the table does not contain an entry correlating the third layer 3 address with the third layer 2 address, the method further comprises adding an entry to the table that correlates the third layer 3 address with the third layer 2 address.

4. The method of claim 3, wherein, if the destination addresses of an incoming data frame contain the first layer 2 address and a layer 3 address that matches an entry in the table, the method further comprises replacing the first layer 2 address with the layer 2 address from the matching entry in the table.

5. The method of claim 1, wherein the layer 2 addresses are Ethernet addresses and the layer 3 addresses are Internet Protocol addresses.

6. The method of claim 1, wherein the network connection comprises a wireless network interface card.

7. The method of claim 1, wherein the network connection comprises a plurality of network interface cards and a network interface card (NIC) teaming solution.

8. The method of claim 1, wherein the computer system further includes one or more additional virtual machines that are also allowed to share the network connection, the multiple virtual machines being interconnected by a virtual network within the computer network.

9. The method of claim 8, wherein the virtual network comprises a virtual switch.

10. A computer program embodied in a tangible medium, the computer program being executable in a computer system, the computer system having a network connection to a computer network, the network connection having a first layer 2 address associated therewith, the computer system also including a virtual machine, the virtual machine using a second layer 2 address and a second layer 3 address for communications with the computer network, the second layer 2 address being different from the first layer 2 address, the computer program comprising:
    a virtual network connector for conveying data frames between the virtual machine and the computer network using the network connection; and
    a mapping unit for selectively modifying layer 2 addresses within data frames as they are conveyed between the virtual machine and the network connection,
    wherein, for an outgoing data frame from the virtual machine to the computer network, the mapping unit replaces the second layer 2 address of the virtual machine with the first layer 2 address of the network connection, and,
    wherein, for an incoming data frame from the computer network to the virtual machine, if the incoming data frame is addressed using the first layer 2 address of the network connection and the second layer 3 address of the virtual machine, the mapping unit replaces the first layer 2 address of the network connection with the second layer 2 address of the virtual machine.

11. The computer program of claim 10, wherein the first layer 2 address and a first layer 3 address are used by a host world for communications with the computer network.

12. The computer program of claim 10, wherein the virtual network connector interfaces with a virtual switch, which further interfaces with the virtual machine, along with one or more additional virtual machines also executing within the computer system.

13. The computer program of claim 10, wherein the virtual network connector comprises a high-level interface that interfaces with a host network subsystem running in a host world of the computer system.

14. The computer program of claim 13, wherein the virtual network connector further comprises a low-level interface that also interfaces with the host network subsystem running in the host world of the computer system.

15. The computer program of claim 10, wherein the virtual network connector comprises an intermediate driver that interfaces with a host network subsystem running in a host world of the computer system.

16. The computer program of claim 10, wherein the computer system also includes one or more additional virtual machines, with each virtual machine having a layer 2 address that is unique among layer 2 addresses within the computer system and a layer 3 address that is unique among layer 3 addresses within the computer system, the computer program further comprising a table for correlating layer 2 addresses with layer 3 addresses for the multiple virtual machines, and wherein, if the destination addresses of an incoming data frame contain the first layer 2 address and a layer 3 address that matches an entry in the table, the mapping unit replaces the first layer 2 address with the layer 2 address from the matching entry in the table.

17. The computer program of claim 16, wherein each entry of the table also includes a time value for indicating a relative time at which the entry was last added or updated.

18. The computer program of claim 10, wherein the virtual machine includes a virtual network interface card and a network software system to enable the virtual machine to use the virtual network interface card as if it were a physical network interface card connected to the computer network, and wherein the virtual network connector conveys data frames to and from the virtual machine using the network software system.

19. A method for sharing a network connection between a first software entity and a second software entity, the network connection connecting a single physical computer system to a computer network, both software entities executing within the single physical computer system, the method comprising:
    allowing the first software entity to use the network connection using a first lower layer network address and a first higher layer network address;
    allowing the second software entity to attempt to use the network connection using a second lower layer network address and a second higher layer network address, the second lower layer network address being different from the first lower layer network address and the second higher layer network address being different from the first higher layer network address;
    for an outgoing data frame from the second software entity to the computer network, replacing an occurrence of the second lower layer network address within the outgoing data frame with the first lower layer network address, so that the data frame appears to have originated from a network entity using the first lower layer network address and the second higher layer network address; and
    for an incoming data frame from the computer network, if the data frame is addressed using the first lower layer network address and the second higher layer network address, replacing the first lower layer network address with the second lower layer network address and conveying the data frame toward the second software entity, so that, after modification, the incoming data frame appears to have been addressed to the second software entity, using the second lower layer network address and the second higher layer network address.

20. The method of claim 19, wherein the first software entity is a host software system and the second software entity is a virtual machine.

21. The method of claim 19, wherein the lower layer network addresses are Ethernet addresses and the higher layer network addresses are Internet Protocol addresses.

22. The method of claim 19, wherein, if the outgoing data frame comprises a Dynamic Host Configuration Protocol (DHCP) request, the method further comprises setting a broadcast bit in the DHCP request, indicating that any reply to the DHCP request is to be broadcast, instead of being unicast.

23. The method of claim 19, wherein, if the outgoing data frame comprises a Dynamic Host Configuration Protocol (DHCP) request, the method further comprises replacing an occurrence of the second lower layer network address in a chaddr field of the DHCP request with the first lower layer network address and placing the second lower layer network address into a client identifier extension of the DHCP request.

24. The method of claim 23, wherein, if the incoming data frame comprises a Dynamic Host Configuration Protocol (DHCP) reply, the method further comprises replacing the first lower layer network address in the incoming data frame with a lower layer network address from a client identifier extension of the DHCP reply.

25. The method of claim 23, wherein, if the incoming data frame comprises a Dynamic Host Configuration Protocol (DHCP) reply, the method further comprises replacing the first lower layer network address in the incoming data frame with a lower layer network address that is determined based on correlating a transaction identifier value with a prior outgoing DHCP request.

26. The method of claim 19, wherein, if the outgoing data frame comprises an Address Resolution Protocol (ARP) request, the method further comprises replacing an occurrence of the second lower layer network address within the ARP request with the first lower layer network address.

27. The method of claim 19, wherein, if the outgoing data frame comprises a Reverse Address Resolution Protocol (RARP) request, the method further comprises replacing an occurrence of the second lower layer network address within the RARP request with the first lower layer network address.

28. A method for sharing a network connection between a first software entity and a second software entity, the network connection connecting a single physical computer system to a computer network, the network connection having a first layer 2 address associated therewith, both software entities executing within the single physical computer system, the method comprising:
    allowing the first software entity to attempt to use the network connection using a second lower layer network address and a second higher layer network address, the second lower layer network address being different from the first lower layer network address;
    allowing the second software entity to attempt to use the network connection using a third lower layer network address and a third higher layer network address, the third lower layer network address being different from the first lower layer network address and from the second lower layer network address, and the third higher layer network address being different from the second higher layer network address;
    for an outgoing data frame from the first software entity to the computer network, replacing an occurrence of the second lower layer network address within the outgoing data frame with the first lower layer network address, so that the data frame appears to have originated from a network entity using the first lower layer network address and the second higher layer network address;

for an outgoing data frame from the second software entity to the computer network, replacing an occurrence of the third lower layer network address within the outgoing data frame with the first lower layer network address, so that the data frame appears to have originated from a network entity using the first lower layer network address and the third higher layer network address;

for an incoming data frame from the computer network, if the data frame is addressed using the first lower layer network address and the second higher layer network address, replacing the first lower layer network address with the second lower layer network address and conveying the data frame toward the first software entity, so that, after modification, the incoming data frame appears to have been addressed to the first software entity, using the second lower layer network address and the second higher layer network address; and for an incoming data frame from the computer network, if the data frame is addressed using the first lower layer network address and the third higher layer network address, replacing the first lower layer network address with the third lower layer network address and conveying the data frame toward the second software entity, so that, after modification, the incoming data frame appears to have been addressed to the second software entity, using the third lower layer network address and the third higher layer network address.

29. The method of claim 28, wherein the first software entity is a host software system and the second software entity is a virtual machine.

30. The method of claim 28, wherein the first software entity is a first virtual machine and the second software entity is a second virtual machine.

* * * * *

UNITED STATES PATENT AND TRADEMARK OFFICE
CERTIFICATE OF CORRECTION

| | |
|---|---|
| PATENT NO. | : 7,478,173 B2 |
| APPLICATION NO. | : 10/741242 |
| DATED | : January 13, 2009 |
| INVENTOR(S) | : Matthew Ray Delco |

Page 1 of 1

It is certified that error appears in the above-identified patent and that said Letters Patent is hereby corrected as shown below:

Title page item (73) Assignee, change

"WMware, Inc., Palo Alto, CA (US)"

to

--VMware, Inc., Palo Alto, CA (US)--.

Signed and Sealed this

Seventh Day of April, 2009

JOHN DOLL
*Acting Director of the United States Patent and Trademark Office*